US011711733B2

(12) United States Patent
Akl et al.

(10) Patent No.: US 11,711,733 B2
(45) Date of Patent: Jul. 25, 2023

(54) ENHANCED CONTEXT TRANSFER OF AN INTEGRATED ACCESS AND BACKHAUL NODE

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Ozcan Ozturk, San Diego, CA (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/318,759

(22) Filed: May 12, 2021

(65) Prior Publication Data

US 2021/0360491 A1     Nov. 18, 2021

Related U.S. Application Data

(60) Provisional application No. 63/025,908, filed on May 15, 2020.

(51) Int. Cl.
*H04W 36/00* (2009.01)
*H04W 40/22* (2009.01)

(52) U.S. Cl.
CPC ....... *H04W 36/0033* (2013.01); *H04W 40/22* (2013.01)

(58) Field of Classification Search
CPC ............. H04W 36/0033; H04W 40/22; H04W 36/0009; H04W 40/36; H04W 36/00; H04W 36/08; H04W 88/04
See application file for complete search history.

(56) References Cited

U.S. PATENT DOCUMENTS

| 9,749,966 | B2* | 8/2017 | Lindoff | H04W 52/243 |
| 2012/0252355 | A1* | 10/2012 | Huang | H04W 36/0033 455/7 |

(Continued)

FOREIGN PATENT DOCUMENTS

| EP | 3506674 A1 | 7/2019 |
| EP | 3624493 A1 | 3/2020 |

(Continued)

OTHER PUBLICATIONS

International Search Report and Written Opinion—PCT/US2021/032309—ISA/EPO—dated Sep. 23, 2021.

*Primary Examiner* — Nathan S Taylor
(74) *Attorney, Agent, or Firm* — Holland & Hart LLP

(57) ABSTRACT

Methods, systems, and devices for wireless communications are described. a first donor node may serve a relay node, which in turn may serve a child node. The first donor node may determine to transfer (e.g., via a handover procedure) the relay node to a second donor node. The first donor node may transmit a first context transfer request for the relay node to the second donor node, and may transmit a second context transfer request for the child node of the relay node to the second donor node. The first donor node may indicate a correlation between the two context transfers. The second donor node may identify the correlated context transfers, and may successfully perform a migration procedure for the relay node and any descendent devices or nodes based on the correlated context transfers.

28 Claims, 15 Drawing Sheets

(56) References Cited

U.S. PATENT DOCUMENTS

| | | | |
|---|---|---|---|
| 2019/0215733 A1* | 7/2019 | Wang | H04W 36/0009 |
| 2019/0394823 A1* | 12/2019 | Jo | B60W 50/14 |
| 2020/0128447 A1* | 4/2020 | Ying | H04W 36/08 |
| 2020/0145967 A1* | 5/2020 | Park | H04W 72/042 |
| 2021/0058826 A1* | 2/2021 | Mao | H04W 28/0808 |
| 2021/0058989 A1* | 2/2021 | Simsek | H04L 47/283 |
| 2021/0084536 A1* | 3/2021 | Chou | H04W 36/08 |
| 2021/0160735 A1* | 5/2021 | Fujishiro | H04W 36/0055 |
| 2021/0176692 A1* | 6/2021 | Rugeland | H04W 36/0072 |
| 2021/0211952 A1* | 7/2021 | Teyeb | H04W 76/15 |
| 2021/0219368 A1* | 7/2021 | Fujishiro | H04W 76/19 |
| 2021/0227442 A1* | 7/2021 | Yiu | H04W 36/00837 |
| 2022/0014976 A1* | 1/2022 | Luo | H04W 36/0055 |
| 2022/0095332 A1* | 3/2022 | Li | H04L 1/1671 |
| 2022/0104088 A1* | 3/2022 | Byun | H04W 36/023 |
| 2022/0104154 A1* | 3/2022 | Wei | H04W 36/305 |
| 2022/0159565 A1* | 5/2022 | Park | H04W 48/08 |

FOREIGN PATENT DOCUMENTS

| | | | | |
|---|---|---|---|---|
| WO | WO-2020227653 A1 * | 11/2020 | | H04L 69/04 |
| WO | WO-2021161866 A1 * | 8/2021 | | |
| WO | WO-2021161880 A1 * | 8/2021 | | |
| WO | WO-2021215979 A1 * | 10/2021 | | |
| WO | WO-2021220937 A1 * | 11/2021 | | |

\* cited by examiner

ENHANCED CONTEXT TRANSFER OF AN INTEGRATED ACCESS AND BACKHAUL NODE

CROSS REFERENCE

The present application for patent claims the benefit of U.S. Provisional Patent Application No. 63/025,908 by Akl et al., entitled "ENHANCED CONTEXT TRANSFER OF AN INTEGRATED ACCESS AND BACKHAUL NODE," filed May 15, 2020, assigned to the assignee hereof, and expressly incorporated by reference herein.

FIELD OF TECHNOLOGY

The following relates generally to wireless communications and more specifically to enhanced context transfer of an integrated access and backhaul (IAB) node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may be configured as integrated access and backhaul (IAB) networks, where one or more access nodes have wireless backhaul connections to a network. An IAB network architecture may include a chain of wireless devices connected via communication links (e.g., starting with a donor node connected to the core network and ending with a UE, with any number of relay nodes in between).

SUMMARY

The described techniques relate to improved methods, systems, devices, and apparatuses that support enhanced context transfer of an integrated access and backhaul (IAB) node. Generally, a first donor node may serve a relay node, which in turn may serve a child node. The first donor node may determine to transfer (e.g., via a handover procedure) the relay node to a second donor node. The first donor node may transmit a first context transfer request for the relay node to the second donor node, and may transmit a second context transfer request for the child node of the relay node to the second donor node. The first donor node may indicate a correlation or correspondence between the two context transfers. As an example, the first donor node may include an identifier with one or both context transfers. Upon receiving the same identifier in both context transfers, the second node may determine a relationship between the transferred devices (e.g., that the second device is a child of the first device) and that the context transfer requests are correlated (correspond).

The first donor node may include the first and second context transfer requests in the same or separate messages. In some examples, the first donor node may make additional context transfer requests (e.g., in the same or separate messages as the first or second context transfer requests), and may indicate a correlation to the previous context transfer requests. In some examples, the first donor node may include additional information related to the correlated context transfer requests to the second donor node. For example, the first donor node may indicate a count of context transfer requests (e.g., a number of upcoming correlated context transfers or correlated context transfers that have already occurred), a depth value (e.g., correlated with a context transfer, such as a hop count relative to the first transferred relay node or a maximum depth of correlation for the remaining context transfers), or the like.

A method of wireless communications at a first donor node is described. The method may include transmitting, to a second donor node, a first context transfer request and a second context transfer request, the first context transfer request associated with a mobile-termination (MT) function of a relay node, and the second context transfer request corresponding to the first context transfer request and associated with one or more child nodes of the relay node, receiving, from the second donor node, acknowledgement feedback responsive to the first context transfer request and the second context transfer request, and transmitting, to the relay node based on receiving the acknowledgement feedback, one or more reconfiguration messages including an instruction for the one or more child nodes and the relay node to establish a first connection with the second donor node.

An apparatus for wireless communications at a first donor node is described. The apparatus may include a processor, memory coupled with the processor, and instructions stored in the memory. The instructions may be executable by the processor to cause the apparatus to transmit, to a second donor node, a first context transfer request and a second context transfer request, the first context transfer request associated with an MT function of a relay node, and the second context transfer request corresponding to the first context transfer request and associated with one or more child nodes of the relay node, receive, from the second donor node, acknowledgement feedback responsive to the first context transfer request and the second context transfer request, and transmit, to the relay node based on receiving the acknowledgement feedback, one or more reconfiguration messages including an instruction for the one or more child nodes and the relay node to establish a first connection with the second donor node.

Another apparatus for wireless communications at a first donor node is described. The apparatus may include means for transmitting, to a second donor node, a first context transfer request and a second context transfer request, the first context transfer request associated with an MT function of a relay node, and the second context transfer request corresponding to the first context transfer request and associated with one or more child nodes of the relay node, receiving, from the second donor node, acknowledgement feedback responsive to the first context transfer request and the second context transfer request, and transmitting, to the relay node based on receiving the acknowledgement feedback, one or more reconfiguration messages including an instruction for the one or more child nodes and the relay node to establish a first connection with the second donor node.

A non-transitory computer-readable medium storing code for wireless communications at a first donor node is described. The code may include instructions executable by a processor to transmit, to a second donor node, a first context transfer request and a second context transfer request, the first context transfer request associated with an MT function of a relay node, and the second context transfer request corresponding to the first context transfer request and associated with one or more child nodes of the relay node, receive, from the second donor node, acknowledgement feedback responsive to the first context transfer request and the second context transfer request, and transmit, to the relay node based on receiving the acknowledgement feedback, one or more reconfiguration messages including an instruction for the one or more child nodes and the relay node to establish a first connection with the second donor node.

In some examples of the method, apparatuses, and non-transitory computer-readable medium described herein, transmitting the first context transfer request and the second context transfer request may include operations, features, means, or instructions for transmitting a single message including the first context transfer request and the second context transfer request.

In some examples of the method, apparatuses, and non-transitory computer-readable medium described herein, the single message may be a handover request message, a secondary node addition request message, a secondary node change required message, or a secondary node modification request message.

In some examples of the method, apparatuses, and non-transitory computer-readable medium described herein, transmitting the first context transfer request and the second context transfer request may include operations, features, means, or instructions for transmitting a first message including the first context transfer request, and transmitting a second message including the second context transfer request.

In some examples of the method, apparatuses, and non-transitory computer-readable medium described herein, the first message may be a handover request message, a secondary node addition request message, or a secondary node modification request message; and, and the second message may be a handover request message, a secondary node addition request message, a secondary node change required message, or a secondary node modification request message.

Some examples of the method, apparatuses, and non-transitory computer-readable medium described herein may further include operations, features, means, or instructions for including, in the second context transfer request, a migration procedure identifier corresponding to the first context transfer request, where receiving the acknowledgement feedback may be based on the migration procedure identifier.

In some examples of the method, apparatuses, and non-transitory computer-readable medium described herein, the migration procedure identifier matches a second migration procedure identifier included in the first context transfer request, the second migration procedure identifier including a label associated with the first context transfer request, one or more device identifiers for the one or more child nodes, or a combination thereof.

In some examples of the method, apparatuses, and non-transitory computer-readable medium described herein, the migration procedure identifier includes a device identifier for the relay node, the device identifier associated with base station interface communications between the first donor node and the second donor node.

In some examples of the method, apparatuses, and non-transitory computer-readable medium described herein, the migration procedure identifier includes address information allocated to the relay node by the second donor node.

Some examples of the method, apparatuses, and non-transitory computer-readable medium described herein may further include operations, features, means, or instructions for receiving, from the second donor node or the relay node, an indication of the migration procedure identifier, where including the migration procedure identifier in the second context transfer request may be based on receiving the indication of the migration procedure identifier.

Some examples of the method, apparatuses, and non-transitory computer-readable medium described herein may further include operations, features, means, or instructions for transmitting, to the second donor node or the relay node, a request for the indication of the migration procedure identifier, where receiving the indication of the migration procedure identifier from the second donor node or the relay node may be based on transmitting the request for the indication of the migration procedure identifier.

Some examples of the method, apparatuses, and non-transitory computer-readable medium described herein may further include operations, features, means, or instructions for transmitting, to the second donor node, a third context transfer request corresponding to the second context transfer request, the third context transfer request associated with an MT function of one or more additional child nodes of the relay node, one or more additional child nodes associated with distributed unit (DU) functions of the one or more child nodes, or a combination thereof.

In some examples of the method, apparatuses, and non-transitory computer-readable medium described herein, a single message includes the first context transfer request, the second context transfer request, and the third context transfer request.

In some examples of the method, apparatuses, and non-transitory computer-readable medium described herein, a first message includes the first context transfer request and the second context transfer request, and where a second message includes the third context transfer request.

In some examples of the method, apparatuses, and non-transitory computer-readable medium described herein, a first message includes the first context transfer request, a second message includes the second context transfer request, and a third message includes the third context transfer request.

Some examples of the method, apparatuses, and non-transitory computer-readable medium described herein may further include operations, features, means, or instructions for including, in the first context transfer request, an indication of one or more context transfer requests to be transmitted.

In some examples of the method, apparatuses, and non-transitory computer-readable medium described herein, a first message includes the first context transfer request, and where the indication of the one or more context transfer requests to be transmitted includes the second context transfer request in the first message.

In some examples of the method, apparatuses, and non-transitory computer-readable medium described herein, a first message includes the first context transfer request, and where the indication of the one or more context transfer requests to be transmitted includes the second context transfer request in a second message.

Some examples of the method, apparatuses, and non-transitory computer-readable medium described herein may further include operations, features, means, or instructions for including, in a first message including the first context transfer request, an indication of a number of one or more subsequent context transfer requests corresponding to the first context transfer request, the one or more subsequent context transfer requests including the second context transfer request, and including, in a second message including the second context transfer request, an indication of a number of one or more previously transmitted context transfer requests corresponding to the second context transfer request.

Some examples of the method, apparatuses, and non-transitory computer-readable medium described herein may further include operations, features, means, or instructions for including, in the first context transfer request or the second context transfer request, an indication that no subsequent context transfer requests may be pending.

Some examples of the method, apparatuses, and non-transitory computer-readable medium described herein may further include operations, features, means, or instructions for including, in the first context transfer request, a depth value indicating a number of hops in a chain of nodes that includes the relay node and the one or more child nodes.

Some examples of the method, apparatuses, and non-transitory computer-readable medium described herein may further include operations, features, means, or instructions for receiving, from the second donor node, an indication of a maximum number of corresponding context transfer requests that the second donor node may be capable of processing in a single message, and configuring, based on receiving the indication of the maximum number, a single message including the first context transfer request and the second context transfer request, or a first message including the first context transfer request and a second message including the second context transfer request.

Some examples of the method, apparatuses, and non-transitory computer-readable medium described herein may further include operations, features, means, or instructions for transmitting, to the second donor node, a request for the maximum number, where receiving the indication of the maximum number may be based on transmitting the request for the maximum number.

Some examples of the method, apparatuses, and non-transitory computer-readable medium described herein may further include operations, features, means, or instructions for receiving, from the second donor node responsive to transmitting a first message including the first context transfer request, a migration procedure identifier corresponding to the first context transfer request, and including the migration procedure identifier in a second message including the second context transfer request.

Some examples of the method, apparatuses, and non-transitory computer-readable medium described herein may further include operations, features, means, or instructions for including, in the first message, an indication that the first context transfer request may be associated with the MT function of the relay node, where receiving the migration procedure identifier from the second donor node may be based on the indication that the first context transfer request may be associated with the MT function of the relay node.

Some examples of the method, apparatuses, and non-transitory computer-readable medium described herein may further include operations, features, means, or instructions for including, in the first context transfer request message, an indication of one or more context transfer requests to be transmitted, where receiving the migration procedure identifier from the second donor node may be based on the indication of subsequent context transfer requests.

Some examples of the method, apparatuses, and non-transitory computer-readable medium described herein may further include operations, features, means, or instructions for including, in the second context transfer request, a cell identifier that may be associated with the first donor node for a cell served by a DU function of the relay node, where receiving the acknowledgement feedback responsive to the first context transfer request and the second context transfer request may be based on including the cell identifier for the cell served by the DU of the relay node.

Some examples of the method, apparatuses, and non-transitory computer-readable medium described herein may further include operations, features, means, or instructions for including, in the second context transfer request, a cell identifier associated with the second donor node for a cell that may be not served by the second donor node, where receiving the acknowledgement feedback responsive to the first context transfer request and the second context transfer request may be based on including the cell identifier for the cell that may be not served by the second donor node.

Some examples of the method, apparatuses, and non-transitory computer-readable medium described herein may further include operations, features, means, or instructions for transmitting, to the second donor node, a request for a list of cell identifiers served by the second donor node, and receiving, from the second donor node, the list of cell identifiers served by the second donor node, where including the cell identifier associated with the second donor node for the cell that may be not served by the second donor node may be based on receiving the list of cell identifiers served by the second donor node.

In some examples of the method, apparatuses, and non-transitory computer-readable medium described herein, receiving the acknowledgement feedback responsive to the first context transfer request and the second context transfer request may include operations, features, means, or instructions for receiving an acknowledgement message including acknowledgement feedback for the first context transfer request and acknowledgement feedback for the second context transfer request.

In some examples of the method, apparatuses, and non-transitory computer-readable medium described herein, the acknowledgement message includes one of a handover request acknowledgement message, a secondary node addition request acknowledgement message, a secondary node modification request acknowledgment message, or a secondary node change confirmation message.

In some examples of the method, apparatuses, and non-transitory computer-readable medium described herein, receiving the acknowledgement feedback responsive to the first context transfer request and the second context transfer request may include operations, features, means, or instructions for receiving a first acknowledgement message including acknowledgement feedback for the first context transfer request, and receiving a second acknowledgement message including acknowledgement feedback for the second context transfer request.

In some examples of the method, apparatuses, and non-transitory computer-readable medium described herein, the first acknowledgement message includes one of a handover request acknowledgement message, a secondary node addition request acknowledgement message, a secondary node modification request acknowledgment message, or a secondary node change confirmation message, and where the second acknowledgement message includes one of a handover request acknowledgement message, a secondary node addition request acknowledgement message, a secondary node modification request acknowledgment message, or a secondary node change confirmation message.

Some examples of the method, apparatuses, and non-transitory computer-readable medium described herein may further include operations, features, means, or instructions for transmitting, to the second donor node, an indication of a maximum amount of acknowledgement feedback the first donor node may be capable of processing in a single acknowledgement feedback message, where receiving the acknowledgement feedback responsive to the first context transfer request and the second context transfer request may be based on transmitting the indication of the maximum amount of acknowledgement feedback.

Some examples of the method, apparatuses, and non-transitory computer-readable medium described herein may further include operations, features, means, or instructions for receiving, from the second donor node, a request for the maximum amount of acknowledgement feedback, where transmitting the indication of the maximum amount of acknowledgement feedback may be based on receiving the request for the maximum amount of acknowledgement feedback.

In some examples of the method, apparatuses, and non-transitory computer-readable medium described herein, the one or more child nodes include user equipment (UEs) served by the relay node, one or more UEs served by descendant relay nodes of the relay node, MT functions of one or more additional relay nodes served by the relay node, MT functions of one or more descendant relay nodes of the relay node, or a combination thereof.

Some examples of the method, apparatuses, and non-transitory computer-readable medium described herein may further include operations, features, means, or instructions for transmitting, to the relay node based on receiving the acknowledgement feedback, one or more reconfiguration messages including an instruction for the one or more child nodes or the relay node or both to release one or more second connections with the first donor node, the relay node, or both.

A method of wireless communication at a second donor node is described. The method may include receiving, from a first donor node, a first context transfer request and a second context transfer request, the first context transfer request associated with an MT function of a relay node, and the second context transfer request corresponding to the first context transfer request and associated with one or more child nodes of the relay node, transmitting, to the first donor node, acknowledgement feedback responsive to the first context transfer request and the second context transfer request, and receiving, from the relay node based on transmitting the acknowledgement feedback for the first context transfer request and the second context transfer request to the first donor node, a connection message requesting to establish a first connection with the second donor node for the relay node and the one or more child nodes.

An apparatus for wireless communication at a second donor node is described. The apparatus may include a processor, memory coupled with the processor, and instructions stored in the memory. The instructions may be executable by the processor to cause the apparatus to receive, from a first donor node, a first context transfer request and a second context transfer request, the first context transfer request associated with an MT function of a relay node, and the second context transfer request corresponding to the first context transfer request and associated with one or more child nodes of the relay node, transmit, to the first donor node, acknowledgement feedback responsive to the first context transfer request and the second context transfer request, and receive, from the relay node based on transmitting the acknowledgement feedback for the first context transfer request and the second context transfer request to the first donor node, a connection message requesting to establish a first connection with the second donor node for the relay node and the one or more child nodes.

Another apparatus for wireless communication at a second donor node is described. The apparatus may include means for receiving, from a first donor node, a first context transfer request and a second context transfer request, the first context transfer request associated with an MT function of a relay node, and the second context transfer request corresponding to the first context transfer request and associated with one or more child nodes of the relay node, transmitting, to the first donor node, acknowledgement feedback responsive to the first context transfer request and the second context transfer request, and receiving, from the relay node based on transmitting the acknowledgement feedback for the first context transfer request and the second context transfer request to the first donor node, a connection message requesting to establish a first connection with the second donor node for the relay node and the one or more child nodes.

A non-transitory computer-readable medium storing code for wireless communication at a second donor node is described. The code may include instructions executable by a processor to receive, from a first donor node, a first context transfer request and a second context transfer request, the first context transfer request associated with an MT function of a relay node, and the second context transfer request corresponding to the first context transfer request and associated with one or more child nodes of the relay node, transmit, to the first donor node, acknowledgement feedback responsive to the first context transfer request and the second context transfer request, and receive, from the relay node based on transmitting the acknowledgement feedback for the first context transfer request and the second context transfer request to the first donor node, a connection message requesting to establish a first connection with the second donor node for the relay node and the one or more child nodes.

In some examples of the method, apparatuses, and non-transitory computer-readable medium described herein, receiving the first context transfer request and the second context transfer request may include operations, features, means, or instructions for receiving a single message including the first context transfer request and the second context transfer request.

In some examples of the method, apparatuses, and non-transitory computer-readable medium described herein, the single message may be a handover request message, a secondary node addition request message, a secondary node change required message, or a secondary node modification request message.

In some examples of the method, apparatuses, and non-transitory computer-readable medium described herein, receiving the first context transfer request and the second context transfer request may include operations, features, means, or instructions for receiving a first message including the first context transfer request, and receiving a second message including the second context transfer request.

In some examples of the method, apparatuses, and non-transitory computer-readable medium described herein, the first message may be one of a handover request message, a secondary node addition request message, or a secondary node modification request message, and where the second message may be one of a handover request message, a secondary node addition request message, a secondary node change required message, or a secondary node modification request message.

Some examples of the method, apparatuses, and non-transitory computer-readable medium described herein may further include operations, features, means, or instructions for identifying, in the second context transfer request, a migration procedure identifier corresponding to the first context transfer request, where transmitting the acknowledgement feedback may be based on identifying the migration procedure identifier.

In some examples of the method, apparatuses, and non-transitory computer-readable medium described herein, the migration procedure identifier matches a second migration procedure identifier included in the first context transfer request, the second migration procedure identifier including a label associated with the first context transfer request, one or more device identifiers for the one or more child nodes, or a combination thereof.

In some examples of the method, apparatuses, and non-transitory computer-readable medium described herein, the migration procedure identifier includes a device identifier for the relay node, the device identifier associated with base station interface communications between the first donor node and the second donor node.

In some examples of the method, apparatuses, and non-transitory computer-readable medium described herein, the migration procedure identifier includes address information allocated to the relay node by the second donor node.

Some examples of the method, apparatuses, and non-transitory computer-readable medium described herein may further include operations, features, means, or instructions for transmitting, to the first donor node, an indication of the migration procedure identifier, where identifying the migration procedure identifier in the second context transfer request may be based on transmitting the indication of the migration procedure identifier to the first donor node.

Some examples of the method, apparatuses, and non-transitory computer-readable medium described herein may further include operations, features, means, or instructions for receiving, from the first donor node, a request for the indication of the migration procedure identifier, where transmitting the indication of the migration procedure identifier may be based on receiving the request for the indication of the migration procedure identifier.

Some examples of the method, apparatuses, and non-transitory computer-readable medium described herein may further include operations, features, means, or instructions for receiving, from the first donor node, a third context transfer request corresponding to the second context transfer request, the third context transfer request associated with an MT function of one or more additional child nodes of the relay node, one or more additional child nodes associated with DU functions of the one or more child nodes, or a combination thereof.

In some examples of the method, apparatuses, and non-transitory computer-readable medium described herein, a first message includes the first context transfer request, the second context transfer request, and the third context transfer request.

In some examples of the method, apparatuses, and non-transitory computer-readable medium described herein, a first message includes the first context transfer request and the second context transfer request, and where a second message includes the third context transfer request.

In some examples of the method, apparatuses, and non-transitory computer-readable medium described herein, a first message includes the first context transfer request, a second context transfer request includes the second context transfer request, and a third message includes the third context transfer request.

Some examples of the method, apparatuses, and non-transitory computer-readable medium described herein may further include operations, features, means, or instructions for identifying, in the first context transfer request, an indication of one or more context transfer requests to be transmitted.

In some examples of the method, apparatuses, and non-transitory computer-readable medium described herein, a first message includes the first context transfer request, and where the indication of the one or more context transfer requests to be transmitted includes the second context transfer request in the first message.

In some examples of the method, apparatuses, and non-transitory computer-readable medium described herein, a number of the one or more additional context transfer requests located in the first transfer request message exceeds a processing capability per received message for the second donor node.

Some examples of the method, apparatuses, and non-transitory computer-readable medium described herein may further include operations, features, means, or instructions for identifying, in a first message including the first context transfer request, an indication of a number of the one or more context transfer requests to be transmitted corresponding to the first context transfer request, the one or more subsequent context transfer requests including the second context transfer request, and identifying, in a second message including the second context transfer request, an indication of a number of one or more previously transmitted context transfer requests corresponding to the second context transfer request.

Some examples of the method, apparatuses, and non-transitory computer-readable medium described herein may further include operations, features, means, or instructions for identifying, in first context transfer request or the second context transfer request, an indication that no subsequent context transfer requests may be pending.

Some examples of the method, apparatuses, and non-transitory computer-readable medium described herein may further include operations, features, means, or instructions for identifying, in the first context transfer request, a depth value indicating a number of hops in a chain of nodes that includes the relay node and the one or more child nodes.

Some examples of the method, apparatuses, and non-transitory computer-readable medium described herein may further include operations, features, means, or instructions for transmitting, to the first donor node, an indication of a maximum number of corresponding context transfer requests that the second donor node may be capable of processing in a single message, where receiving the first context transfer request and the second context transfer request may be based on transmitting the indication of the maximum number.

Some examples of the method, apparatuses, and non-transitory computer-readable medium described herein may further include operations, features, means, or instructions for receiving, from the first donor node, a request for the maximum number, where transmitting the indication of the maximum number may be based on receiving the request for the maximum number.

Some examples of the method, apparatuses, and non-transitory computer-readable medium described herein may further include operations, features, means, or instructions for transmitting, to the first donor node responsive to receiving a first message including the first context transfer request, a migration procedure identifier corresponding to the first context transfer request, and identifying the migration procedure identifier in a second message including the second context transfer request.

Some examples of the method, apparatuses, and non-transitory computer-readable medium described herein may further include operations, features, means, or instructions for identifying, in the first message, an indication that the first context transfer request may be associated with the MT function of the relay node, where transmitting the migration procedure identifier to the first donor node may be based on the indication that the first context transfer request may be associated with the MT function of the relay node.

Some examples of the method, apparatuses, and non-transitory computer-readable medium described herein may further include operations, features, means, or instructions for identifying, in the first message, an indication of one or more context transfer requests to be transmitted, where transmitting the migration procedure identifier from the second donor node may be based on the indication of the one or more context transfer requests to be transmitted.

Some examples of the method, apparatuses, and non-transitory computer-readable medium described herein may further include operations, features, means, or instructions for identifying, in the second context transfer request, a cell identifier that may be associated with the first donor node for a cell served by a DU of the relay node, and determining, based on the cell identifier, that the second context transfer request corresponds to the first context transfer request, where transmitting the acknowledgement feedback responsive to the first context transfer request and the second context transfer request may be based on determining that the second context transfer request corresponds to the first context transfer request.

Some examples of the method, apparatuses, and non-transitory computer-readable medium described herein may further include operations, features, means, or instructions for identifying, in the second context transfer request, a cell identifier associated with the second donor node for a cell that may be not served by the second donor node, and determining, based on the cell identifier that may be not served by the second donor node, that the second context transfer request corresponds to the first context transfer request, where transmitting the acknowledgement feedback responsive to the first context transfer request and the second context transfer request may be based on determining that the second context transfer request corresponds to the first context transfer request.

Some examples of the method, apparatuses, and non-transitory computer-readable medium described herein may further include operations, features, means, or instructions for receiving, from the first donor node, a request for a list of cell identifiers served by the second donor node, and transmitting, to the first donor node, the list of cell identifiers served by the second donor node, where identifying the cell identifier associated with the second donor node for the cell that may be not served by the second donor node may be based on the list of cell identifiers served by the second donor node.

In some examples of the method, apparatuses, and non-transitory computer-readable medium described herein, transmitting the acknowledgement feedback responsive to the first context transfer request and the second context transfer request may include operations, features, means, or instructions for transmitting an acknowledgement message including acknowledgement feedback for the first context transfer request and acknowledgement feedback for the second context transfer request.

In some examples of the method, apparatuses, and non-transitory computer-readable medium described herein, the acknowledgement message includes one of a handover request acknowledgement message, a secondary node addition request acknowledgement message, a secondary node modification request acknowledgment message, or a secondary node change confirmation message.

In some examples of the method, apparatuses, and non-transitory computer-readable medium described herein, transmitting the acknowledgement feedback responsive to the first context transfer request and the second context transfer request may include operations, features, means, or instructions for transmitting a first acknowledgement message including acknowledgement feedback for the first context transfer request, and transmitting a second acknowledgement message including acknowledgement feedback for the second context transfer request.

In some examples of the method, apparatuses, and non-transitory computer-readable medium described herein, the first acknowledgement message includes one of a handover request acknowledgement message, a secondary node addition request acknowledgement message, a secondary node modification request acknowledgment message, or a secondary node change confirmation message, and where the second acknowledgement message includes one of a handover request acknowledgement message, a secondary node addition request acknowledgement message, a secondary node modification request acknowledgment message, or a secondary node change confirmation message.

Some examples of the method, apparatuses, and non-transitory computer-readable medium described herein may further include operations, features, means, or instructions for receiving, from the first donor node, an indication of a maximum amount of acknowledgement feedback the first donor node may be capable of processing in a single acknowledgement feedback message, where transmitting the acknowledgement feedback responsive to the first context transfer request and the second context transfer request may be based on receiving the indication of the maximum amount of acknowledgement feedback.

Some examples of the method, apparatuses, and non-transitory computer-readable medium described herein may further include operations, features, means, or instructions for transmitting, to the first donor node, a request for the maximum amount of acknowledgement feedback, where receiving the indication of the maximum amount of acknowledgement feedback may be based on transmitting the request for the maximum amount of acknowledgement feedback.

In some examples of the method, apparatuses, and non-transitory computer-readable medium described herein, the one or more child nodes include UEs served by the relay node, one or more UEs served by descendant relay nodes of the relay node, MT functions of one or more additional relay nodes served by the relay node, MT functions of one or more descendant relay nodes of the relay node, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure.

Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
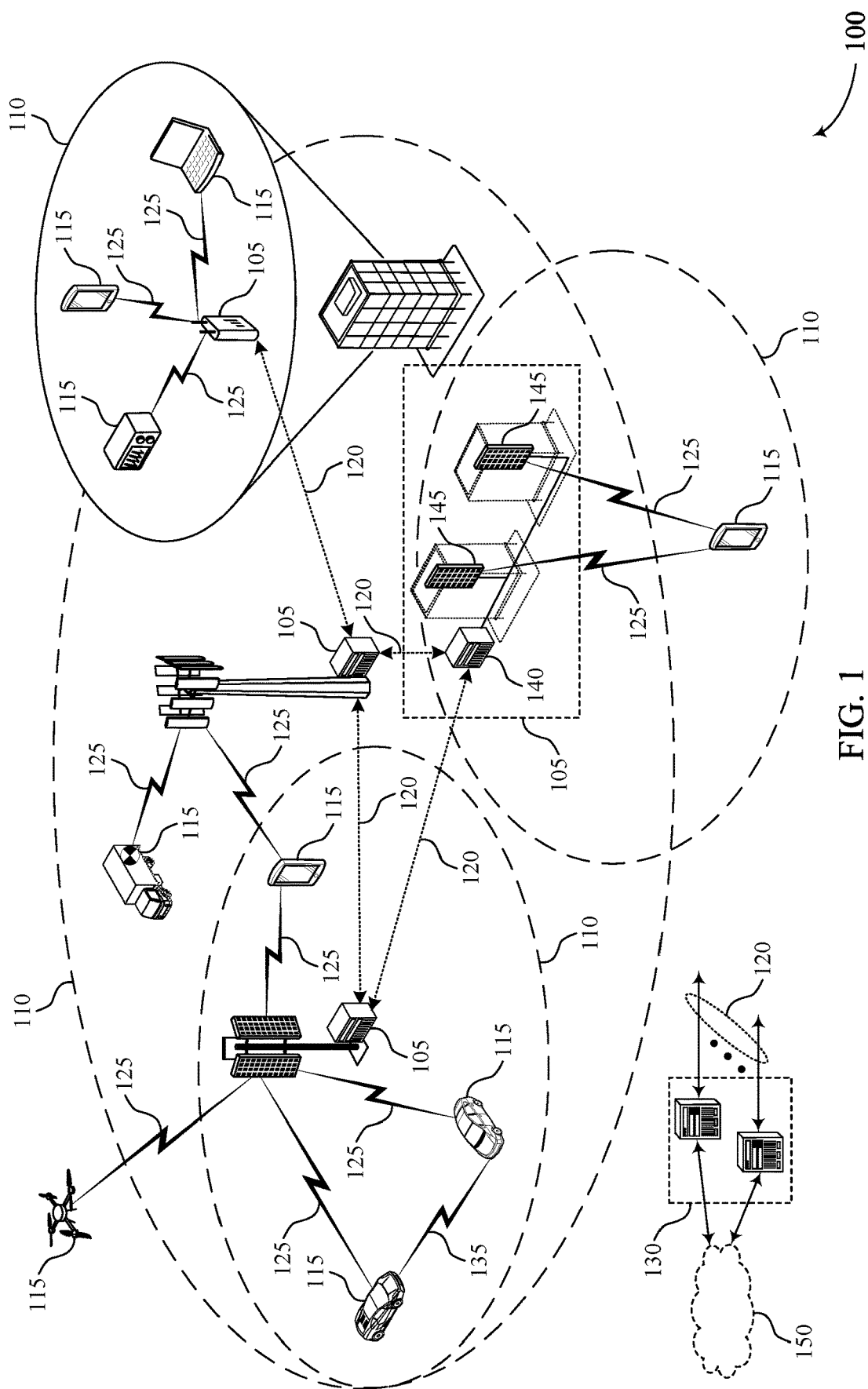
FIGS. 1 through 3 illustrate examples of wireless communications systems that support enhanced context transfer of an integrated access and backhaul (IAB) node in accordance with aspects of the present disclosure.

Wireless communications systems may include access nodes to facilitate wireless communication between a user equipment (UE) and a network. For example, a Long Term Evolution (LTE) or a New Radio (NR) base station may provide a mobile device (e.g., such as a UE) with access to the internet via a wireless network. In some examples, access nodes have a high-capacity, wired, backhaul connection (e.g., fiber) to the network. In some deployments, however, it may be desirable to deploy a larger number of access nodes in a small area to provide acceptable coverage to users. In such deployments, it may be impractical to connect each access node to the network via a wired connection, and some networks or portions thereof may be configured as integrated access and backhaul (IAB) networks where one or more access nodes have wireless backhaul connections to the network.

For example, an IAB network architecture may include a chain of connected wireless devices (e.g., starting with a donor node connected to the core network and ending with a UE, with any number of relay nodes in between). Wireless devices may be connected via link resources that support network access (e.g., NR access) and backhaul capabilities (e.g., a wireline backhaul or wireless backhaul). An IAB node may communicate with a parent node via a parent link, a child node via a child link, and one or more served UEs. A relay node or relay network device may refer to an intermediary node in a relay chain (e.g., an intermediary node in an IAB relay chain). For example, a relay node may relay communications between a parent node (e.g., an IAB donor, or an IAB node upstream or higher on the relay chain) and a child node (e.g., an IAB node downstream or lower on the relay chain). Thus, a relay node may have an established communication link with a parent node (e.g., an established parent link for backhaul communications) as well as an established communication link with each child node (e.g., one or more established child links). While various examples provided herein describe IAB networks, the described techniques for improved resource management communication efficiency for parent and child links in an IAB network may be generally applied to various types of wireless network.

An IAB donor node may include central unit (CU) functionality and distributed unit (DU) functionality, where the CU functionality may configure the network (e.g., through radio resource control (RRC) or packet data convergence protocol (PDCP) layer functions). IAB relay nodes may split into associated mobile-termination (MT) functionality and DU functionality. MT functionality for a relay node may be controlled and or scheduled by a parent node (e.g., a donor node or another upstream node acting as a parent node with respect to the relay node) of the established connectivity via access and backhaul links of a coverage area. DU functionality may schedule child IAB nodes and UEs, and may control both access links and backhaul links under the coverage of the DU functionality.

In some cases, a first IAB donor node may perform a handover procedure to transfer a child node, such as an IAB relay node, to another IAB donor node. The first donor node may also transfer any child nodes or devices downstream of the relay node. During the handover, aspects of the relay node's configuration may change. For example, a cell served by the relay node may be associated with a cell identifier (e.g., a New Radio Cell Global Identity (NCGI), a Physical Cell Identifier (PCI), etc.), which may include an identifier corresponding to the donor node. As the relay node is transferred to the new donor node, the cell identifier may be updated to include the identifier associated with the new donor node. However, after the cell identifier is updated, the first donor node may not be capable of communicating with the child node or UE. While various examples provided herein describe handover procedures, the described techniques may be generally applied to any type of context transfer.

As an example, the first donor node may perform a context transfer for the MT function of the relay node to a second donor node, and may perform a handover procedure for the MT. The first donor node may attempt to perform a context transfer for a child MT of the relay node, followed by a handover of the child MT. However, because the relay node has been fully transferred to the second donor node before the transfer of the child node, the first donor node may have lost a source path to the child node and thus may be unable to communicate with the child node in order to perform the context transfer. Alternatively, the first donor node may determine to perform an MT context transfer of the relay node followed by an MT context transfer of the child node, and may delay the MT handover and child MT handover until after the context transfers. However, in this case, the NCGI may be updated to that of the second donor node during the MT context transfer, and the first donor node may be unaware of the updated NCGI. The first donor node may therefore be unable to indicate, to the child MT of the relay node, the target cell for the transfer.

To enable a first donor node to transfer, to a second donor node, a relay node and any of the relay node's downstream child nodes or UEs, the donor node may determine to combine the context transfers of the relay node and the child nodes. The first donor node may indicate a correlation between the context transfers to the second donor node. For example, the first donor node may include, with one or more context transfer requests, an identifier, such as a label, an identifier of the relay or child MT, a routing identifier of the relay node, or the like. The context transfer requests, and any identifiers, may be sent in the same message or in separate messages. The second donor node may receive the context transfer requests including the identifiers, and may determine a correspondence between the context transfers. For instance, the second donor node may receive a first context transfer request message and a second context transfer request message, where both context transfer request messages include the same identifier indicating a correspondence between the first context transfer request and the second context transfer request. The second donor node may determine, based on the identifier, that the second context transfer request message is for a child node of the relay node indicated in the first context transfer request message, and therefore corresponds to the first context transfer request.

The first donor node may include other indications with or in a context transfer request message. For example, the first donor node may indicate (e.g., with the first context transfer request message or the second context transfer request message) that subsequent correlated context transfer request messages will be forthcoming, or that no more correlated context transfer request messages may occur (when used herein with reference to context transfer request messages, correlated may mean corresponding, and vice versa). In some cases, the first donor node may transfer several descendant nodes of the relay node, and may include a depth value indicating a hop count relative to the relay node. The first or second donor nodes may indicate their capability to one another, such as a maximum depth value the node is capable of handling in a single message, or may query one another for such information. In some cases, the second donor node may provide the identifiers to the first donor node for use in correlation indications (e.g., indications of correspondence or other association).

After receiving the context transfer request messages, the second donor node may transmit an acknowledgement message to the first donor node. The acknowledgement message may include an RRC configuration, which the first donor node may forward to the transferring relay node and its child node(s). In some cases, the acknowledgement message may be transmitted as a single acknowledgement message for each individual context transfer request message. For example, the second donor node may transmit a first acknowledgement request message after receiving a first context transfer request message, a second acknowledgement request message after receiving a second context transfer request message, and so on. In some other cases, the second donor node may include, in a single acknowledgement message, multiple acknowledgements for multiple context transfer request messages.

Particular aspects of the subject matter described herein may be implemented to realize one or more advantages. The described techniques may support improvements in system efficiency such that a donor node may transfer a relay node and some or any descendant nodes or devices to a second donor node without losing communication with the descendant nodes or device. As such, a downstream device may avoid performing a procedure to reestablish a connection (e.g., via a RACH procedure) with the donor node. This may result in improved system efficiency, reliability, robustness, decreased device and system latency, or the like. As such, supported techniques may include improved network operations and, in some examples, may promote device and network efficiencies, among other benefits.

Aspects of the disclosure are initially described in the context of wireless communications systems, process flows, and cell identifier messages. Aspects of the disclosure are further illustrated by and described with reference to apparatus diagrams, system diagrams, and flowcharts that relate to enhanced context transfer of an IAB node.

FIG. 1 illustrates an example of a wireless communications system 100 that supports enhanced context transfer of an IAB node in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a PCI, a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first donor node (e.g., a base station 105 in an IAB system) may serve a relay node, which in turn may serve a child node. The first donor node may determine to transfer (e.g., via a handover procedure) the relay node to a second donor node. The first donor node may transmit a first context transfer request for the relay node to the second donor node, and may transmit a second context transfer request for the child node of the relay node to the second donor node. The first donor node may indicate a correlation between the two context transfers. As an example, the first donor node may include an identifier with one or both context transfers. Upon receiving the same identifier in both context transfers, the second node may determine a relationship between the transferred devices (e.g., that the second device is a child of the first device) and that the context transfer requests are correlated.

Figure 2:
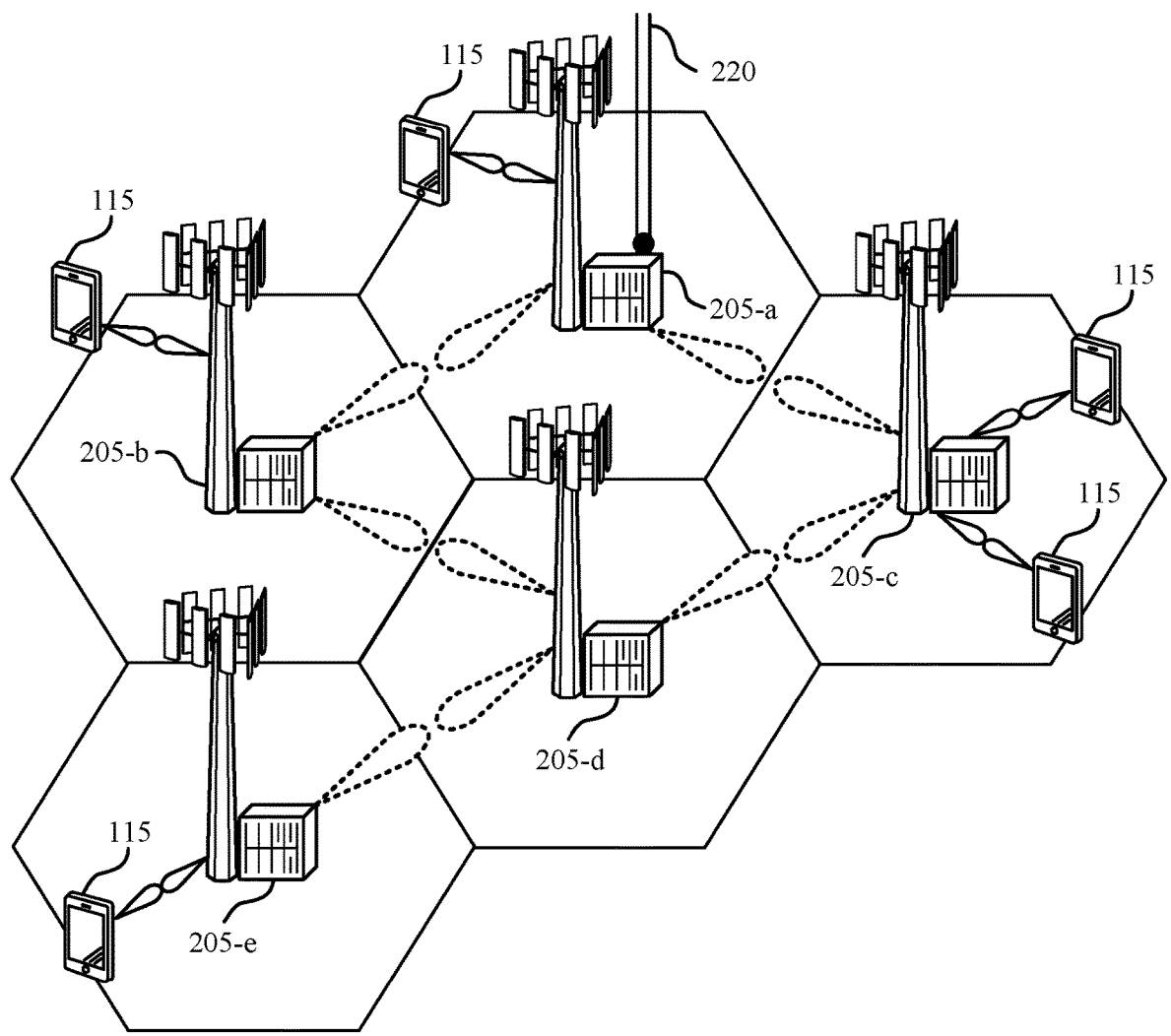

FIG. 2 illustrates an example of a wireless communications system 200 that supports enhanced context transfer of an IAB node in accordance with aspects of the present disclosure. In some examples, the wireless communications system 200 may implement aspects of the wireless communications system 100. The wireless communications system 200 may support one or more nodes 205 (e.g., network devices, such as base stations) supporting network access to one or more UEs 115 within cell coverage areas 110. Infrastructure and spectral resources for network access within the wireless communications system 200 may additionally support wireless backhaul link 215 capabilities in supplement to wireline backhaul connections 220, providing an IAB network architecture.

Aspects of the supporting functionalities of the nodes 205 may be referred to as IAB nodes. For example, the wireless communications system 200 (e.g., an NR system) may implement the IAB architecture by connecting one access node (e.g., a node 205-a) in the wireless communications system 200 to a core network (e.g., a core network 130 as described with reference to FIG. 1) via, for example, a fiber point backhaul connection 220, while other nodes 205 in the wireless communications system 200 (e.g., a node 205-b, a node 205-c, a node 205-d, and a node 205-e) may exchange access traffic with the fiber point backhaul connection 220 via the wireless backhaul network, using wireless backhaul links 215 (e.g., using beamformed wireless backhaul connections). Each node 205 may communicate access traffic with the one or more UEs 115 that it serves over the access network, using access links 210 (e.g., using beamformed wireless access connections).

In wireless communications systems that employ wireline links for backhaul communications, a wireless node may feature a robust wireline link to a network entity that coordinates aspects of backhaul communications (e.g., the network entity provides timing information, cell identity, etc.) for neighboring nodes to coordinate backhaul transmissions. However, in some systems, deploying a wireline link to wireless nodes may result in substantial expense and resource expenditure. For example, wireless nodes operating in mmW frequency ranges may be associated with a reduced coverage area (e.g., a smaller geographic footprint, directional transmissions, etc.), which may result in a deployment of a larger number of access nodes (e.g., nodes 205 or IAB nodes) to provide acceptable coverage areas to users. As a result, a number of nodes 205 within the wireless communications system may not be coupled with a wireline backhaul link and may instead use wireless backhaul links 215 for backhaul communications in a wireless backhaul network.

In some cases, a node 205 (e.g., the node 205-a) may be split into associated base station CU and DU functions (as described in more detail with reference to FIG. 3), where one or more DUs may be partially controlled by an associated CU. The CU function of the node 205-a may facilitate connection between the core network 130 and the node 205-a (e.g., via a wireline backhaul connection 220 or, in some cases, a wireless connection to the core network). The CU entity may control part or all of an IAB network via configuration. The DU functions of the node 205-a may control or schedule functionality for additional devices (e.g., relay base stations or relay IAB nodes 205, such as the node 205-b, the node 205-c, and UEs 115) according to configured wireless backhaul links 215 and wireless access links 210. Based on the supported entities at the node 205-a (e.g., such as the CU entity), the node 205-a may be referred to as an IAB donor or a donor node.

A relay node (e.g., the node 205-b or the node 205-c) may support link connectivity with the IAB donor (e.g., the node 205-a) as part of a relay chain within the IAB network architecture. For example, the node 205-b may be split into associated MT and DU functions (as described in greater detail with reference to FIG. 3), where MT functionality of the node 205-b may be controlled or scheduled by a DU entity of the node 205-a. In some examples, DUs associated with the node 205-b may be controlled by MT functionality of the node 205-b. In addition, in some cases, one or more DU functions of the node 205-b may be partially controlled by signaling messages from CU entities of associated IAB donor nodes (e.g., a CU of the node 205-a) of the network connection (e.g., via an F1 application protocol (AP)). The DU of the node 205-b may support a serving cell (e.g., as described in more detail with reference to FIG. 1) of the IAB network coverage area, and may provide for communications with one or more UEs 115 via access links 210. Based on the supported entities at the node 205-b, the node 205-b may be referred to as a relay node, an IAB node, a relay node, etc.

A node 205 (e.g., a relay node) may thus be configured for access network functionality (ANF) and UE functionality (UEF) to allow the node 205 to act as a scheduling entity and a receiving (e.g., scheduled) entity. Each of the functionalities may be operated via the one or more backhaul links 215. ANF functionality may enable nodes 205 to operate as a scheduling entity over one or more access links 210, and communicate with one or more UEs 115 located within the IAB network. ANF functionality may further enable nodes 205 to operate as a scheduling entity over one or more coupled backhaul links 215, to facilitate communication between the one or more other nodes 205 of the IAB network (e.g., via the mesh topology). UEF functionality may enable nodes 205 to operate as a scheduled entity and communicate with one or more other nodes 205 to receive data. In some cases, a node 205 may include a routing table for examining a received data packet and forwarding the packet along a path of the IAB network toward the specified IP address of the packet's destination. In some cases, each relay node 205 may be associated with a single MT function, and may thus employ backhaul relaying as shown. In some cases, relay nodes 205 may support multiple MT functions, in which case relay nodes 205 may be capable of multi-connected cellular backhaul.

The wireless communications system 200 may employ one or more wireless access links 210 for establishing mobile access to one or more coupled UEs 115. Each of the nodes 205 and the UEs 115 may be configured to support cellular radio access technologies (RATs), such as mmW-based RATs, for access traffic between the UEs 115 and the nodes 205. Moreover, each of nodes 205 may share resources of the configured RATs for access traffic with backhaul traffic over the network (e.g., as in the case of IAB). IAB network solutions may be increasingly beneficial with the evolution of cellular technologies due to enhancements in wireless link capacity. Specifically, IAB network solutions may provide solutions to densification of network cells (i.e., cost reduction of small cell deployments) and increases in data traffic, as a means to maximize spectrum efficiency through joint optimization and integration of access and backhaul resources within the network. For example, IAB network solutions may be suitable for mmW RATs due to a large bandwidth per channel and the ability to mitigate short term signal blocking.

In some examples, a donor node in an IAB network may determine to migrate, via a context transfer, a child node (e.g., a child or descendent IAB node, a descendent relay node, or the like), or child device (e.g., a UE) to another donor node (e.g., to the CU function of another IAB donor). However, such transfers may be unsuccessful do to lost source paths, lack of relevant information, or the like. As described herein, the first donor node may indicate a correlation between a first context transfer for the relay node with one or more context transfer of descendants of the relay node. Accordingly, the relay node and any child nodes or devices may be migrated from the first donor node to the second donor node without losing communication among the nodes.

Figure 3:
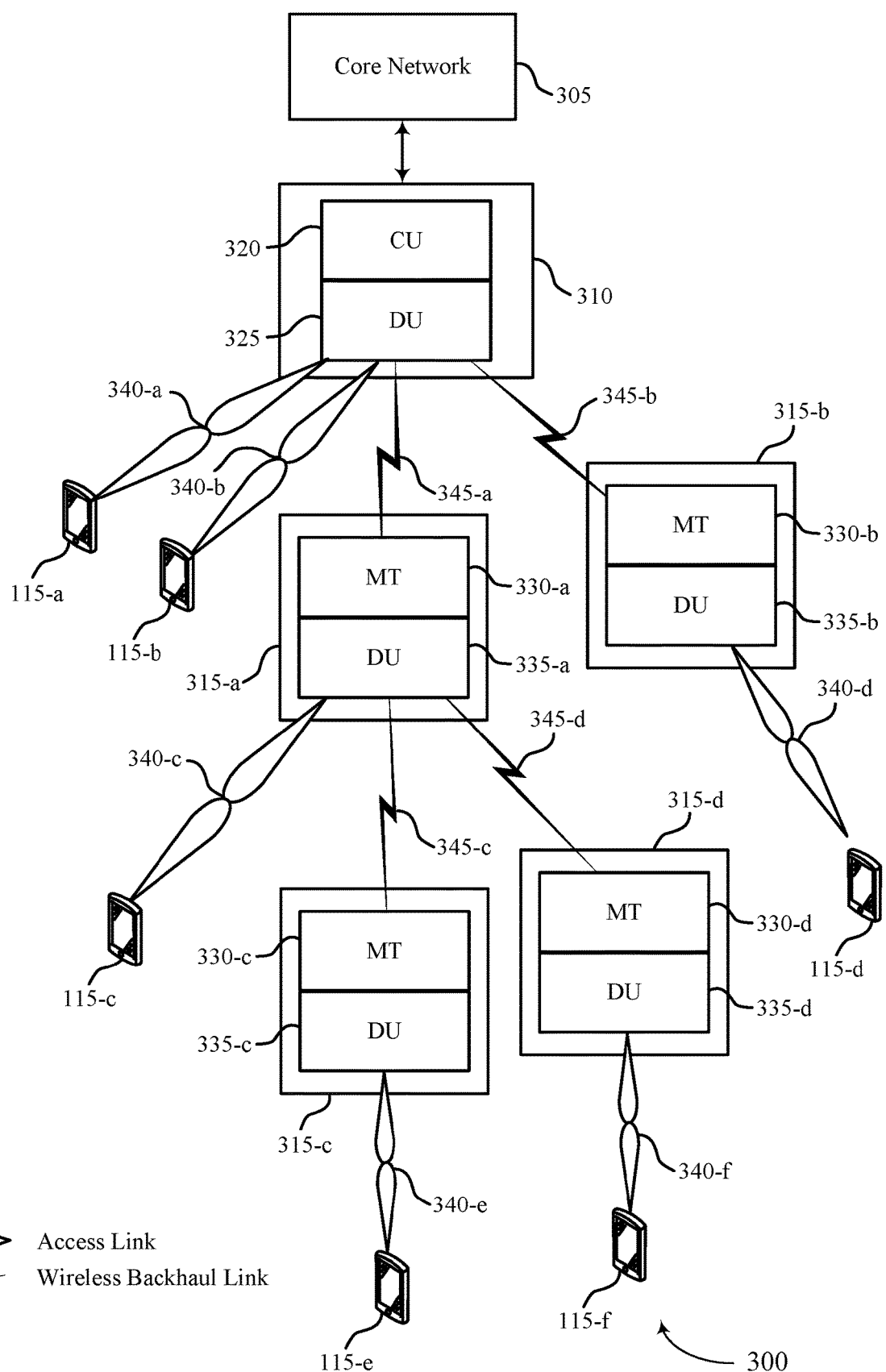

FIG. 3 illustrates an example of a wireless communications system 300 that supports enhanced context transfer of an IAB node in accordance with aspects of the present disclosure. In some examples, the wireless communications system 300 may implement aspects of the wireless communications system 100 or the wireless communications system 200.

The wireless communications system 300 may be an example of an IAB system or an IAB network (e.g., as described in more detail with reference to FIG. 2). For example, the wireless communications system 300 may include an IAB donor node 310, which may be an example of the IAB donor node 205-a as described with reference to FIG. 2. The wireless communications system 300 may also include IAB nodes 315, which may be examples of IAB nodes 205 as described with reference to FIG. 2. In some examples, multiple IAB nodes may be connected inline to improve coverage. In such examples, for a given IAB node, another IAB node that is closer to the IAB donor node (e.g., is a closer descendent in a chain of IAB nodes) may be referred to as a parent node or a parent base station, and a connected IAB node that is further from the IAB donor node may be referred to as a child node or child base station. A parent IAB node may be an IAB donor node 310 or an IAB node 315 (which may be an example of an IAB relay node). In some aspects, an IAB node 315 (e.g., a relay node) may not be directly connected to a wireline backhaul. Instead, the IAB node 315 may connect to the core network 305 via other IAB nodes (e.g., any number of additional IAB nodes 315 and the IAB donor node 310) using wireless backhaul links 345.

A parent IAB node may have a coverage area, which may be an example of a coverage area 110 as described with reference to FIG. 1. A coverage area for an IAB node 315 or an IAB donor node 310 may be divided into sectors making up a portion of the geographic coverage area. Each sector may be associated with a cell. For example, an IAB node 315-c may be in a coverage area served by an IAB node 315-a (e.g., a parent IAB node), but may also have coverage over a cell serving a UE 115-e. A transition along a wireless backhaul link 345 (e.g., a wireless backhaul link 345-c between the parent IAB node 315-a and the child IAB node 315-c) or a transition along an access link 340 (e.g., an access link 340-c between the parent IAB node 315-a and a child UE 115-c) may be considered a hop.

The IAB donor node 310 may include a CU 320 and a DU 325. The CU 320 of the IAB donor node 310 may host layer 3 (L3) (e.g., RRC, service data adoption protocol (SDAP), PDCP) functionality and signaling, and may control the IAB network. The DU 325 of the IAB donor node 310 may host lower layer operations, such as layer 1 or layer 2 (e.g., RLC, MAC, PHY) functionality and signaling. Additionally, the DU 325 of the IAB donor node 310 may support a serving cell within the network coverage area according to connections associated with wireless backhaul links 345 and access links 340 of the IAB network. The DU 325 may control both access and backhaul links within the corresponding network coverage and may provide controlling and scheduling for descendant (i.e., child) IAB nodes 315 (e.g., an IAB relay node) or UEs 115.

For example, the IAB donor node 310 may be in communication with a core network 305. The IAB donor node 310 may communicate with one or more IAB nodes 315 (e.g., IAB relay nodes) via the DU 325. For instance, the DU 325 may be in communication with the IAB node 315-a and the IAB node 315-b via a wireless backhaul link 345-a and a wireless backhaul link 345-b, respectively. The DU 325 may also communicate with a UE 115-a and a UE 115-b via a wireless access link 340-a and a wireless access link 340-b, respectively.

An IAB node 315 may be an example of an access node. In some cases, an IAB node 315 may relay traffic to or from the IAB donor node 310 via one or more hops. For example, the IAB node 315-c may not be directly connected to a wireline backhaul. Instead, the IAB node 315-c may connect to the core network 305 via other IAB nodes, such as the IAB node 315-a, using wireless backhaul links 345-c and 345-a. In some other cases, an IAB node 315 may connect to the core network 305 via any number of additional IAB nodes 315 and the IAB donor node 310 using wireless backhaul links 345.

An IAB node 315 (e.g., a relay IAB node) may include one or both of MTs 330 or DUs 335. IAB nodes 315 may each communicate with descendent child nodes or devices via their respective DUs. For example, a DU 335-a (e.g., belonging to the IAB node 315-a) may communicate with the UE 115-c via the wireless access link 340-c, and with child IAB nodes 315-c and 315-d via wireless backhaul links 345-c and 345-d, respectively. The DU 335-b (e.g., belonging to the IAB node 315-d) may communicate with a UE 115-d via a wireless access link 340-d. In some cases, a child relay node, such as IAB nodes 315-c and 315-d, may further communicate with one or more child nodes or devices (e.g., via their respective DUs). For example, a DU 335-c (e.g., belonging to the IAB node 315-c) may communicate with a UE 115-e via a wireless access link 340-e, and a DU 335-d (e.g., belonging to the IAB node 315-d) may communicate with a UE 115-f via a wireless access link 340-f.

In some cases, DUs 335 of the IAB nodes 315 may be partially controlled by signaling messages from the CU 320 corresponding to the IAB donor node 310. The DUs 335 of the IAB nodes 315 may support serving cells of the network coverage area. For example, the DU 335-a of the IAB node 315-a may perform the same or similar functions as the DU 325 of the IAB donor node 310. The DU 335-a of the IAB node 315-a may support the access link 340-c for the UE 115-c, or one or more of wireless backhaul links 345-c and 345-d for downstream IAB nodes 315-c and 315-d, respectively, or both. DUs 335 may be scheduling nodes within the IAB nodes 315. In some cases, a DU 335 may schedule child IAB nodes 315 or child UEs 115 of the respective IAB node 315. For example, the DU 335-a of the IAB node 315-a may schedule child UE 115-c via the access link 340-c and may schedule IAB nodes 315-c and 315-d via the wireless backhaul links 345-c and 345-d, respectively.

Each IAB node 315 may include an MT 330. An MT 330 may behave as a scheduled node. For example, an MT 330-c and an MT 330-d may behave similar to the UE 115-c in that each is scheduled by its parent IAB node 315-a. Similarly, an MT 330-a may support scheduling of the IAB node 315-a by the DU 325 of the IAB donor node 310. The DU 325 may also schedule the IAB node 315-b via an MT 330-b. In some cases, MT functionality of IAB nodes 315 (e.g., IAB relay nodes) may be controlled or scheduled by parent IAB nodes via wireless backhaul links 345. An IAB node 315 may transmit upstream (e.g., toward the core network 305) in the IAB system using MT functionality. For example, the IAB node 315-d may use MT functionality to transmit uplink messaging along the wireless backhaul link 345-d to the IAB node 315-a.

In some cases, the wireless communications system 300 may include cells corresponding to IAB nodes 315. An IAB node 315 may support a cell over a coverage area. IAB nodes 315 and corresponding cells may be associated with given PCIS. A PCI may be an identification for the cell or the IAB node 315. For example, a PCI may be an identification for the IAB node 315-a or its respective cell. Cells or IAB nodes 315 may select associated PCIS, or a PCI may be selected for the cell by a parent node (e.g., such as the IAB donor node 310) or by the core network 305. In the case of NR networks, cells with the same PCI may be distinguished by different NCGIs. A UE 115 or a child IAB node 315 may be associated with the NCGI or PCI of its parent node.

In some cases, the NCGI or PCI of an IAB node 315 may change. For example, the IAB network may include a mix of stationary or mobile IAB nodes 315 or stationary or mobile UEs 115. In these cases, IAB nodes 315 and UEs 115 may change position within the IAB network. For example, IAB nodes 315 may be installed on vehicles (e.g., a bus, train, or car). In some cases, a mobile IAB node 315 may be a "leaf"

node in the IAB network. A leaf node may be a last hop IAB node 315 with child access UEs 115 connected to it. For example, the IAB node 315-c may be a mobile IAB node 315 and may serve the UE 115-e via the access link 340-e. In this case, the IAB node 315-c may be a leaf node. When a mobile IAB node 315 or UE 115 moves around the mobile IAB network, it may transition to and from different cells, which may be associated with a different NCGI or PCI, or both. In other cases, a parent node (e.g., such as the IAB donor node 310) may determine to transition (e.g., via a context transfer) an IAB node 315 to another donor node (e.g., due to channel degradation, system latency, physical location of a device or node, system congestion, or the like), and the other donor node may be associated with a different NCGI or PCI.

As an example, radio signals of a neighboring cell (i.e., a target cell), may provide an enhanced connection with a UE 115 relative to a current cell (e.g., source cell). In these cases, the UE 115 may be handed over from the source cell to the target cell (e.g., a UE 115 may be handed over to or from a base station 105, an IAB node 315, an IAB donor node 310, etc.). For example, if a connection with the IAB node 315-a may provide enhanced coverage for the UE 115-d, the UE 115-d may release a connection with the IAB node 315-b (e.g., a source IAB node) and establish a connection with the IAB node 315-a (e.g., a target IAB node). Similarly, the IAB node 315-a may be handed over from the IAB donor node 310 to another donor node. Such techniques may include handover procedures.

As an example, the IAB donor node 310 may determine to migrate an IAB node 315 to another donor node. The IAB donor node 310 may transmit a context transfer request message to a second donor node to transfer the IAB node 315-a, and may then perform a handover procedure to hand over the IAB node 315-a to the second donor node. In such examples, the MT 330-a may migrate from the CU 320 of IAB donor node 310 to the CU entity of the second donor node, and the DU 335-a of the IAB node 315-a may also migrate to the second donor node.

If the IAB node 315-a (e.g., a relay node) migrates to the second donor node, then the child IAB nodes 315-c and 315-d, and the UE 115-c, may also migrate to the second donor node. However, the migration may result in a change of NCGI or PCI or both for the child IAB nodes 315-c and 315-d and the UE 115-c (e.g., if the second donor node is associated with an NCGI or PCI different from the IAB donor node 310). In some cases, the IAB donor node 310 or the second donor node may not have knowledge of the NCGI or PCI for the migrating downstream devices. Thus, the IAB donor node 310 and the second donor node may not be able to complete a context transfer or handover procedure within the new NCGI or PCI. In some examples, performing a context transfer for an MT 330 may result in a broken source path, resulting in failure to migrate descendent devices via the DU of the migrating IAB or relay node. For example, if the MT 330-a of the IAB node 315-a is transferred from the CU 320 of IAB donor node 310 to the CU entity of the second donor node, and then the IAB node 315-a is transferred to the second donor node via a handover procedure, a source path to one or more of child IAB node 315-c, child IAB node 315-d, or the UE 115-c may be lost. That is, having performed a context transfer for the MT 330-a, the IAB donor node 310 may be unable to provide context transfer information or commands to downstream device via the DU 335-a. Thus, the IAB donor node 310 may be incapable of performing a handover procedure for the one or more devices for which it has lost a source path.

To enable the IAB donor node 310 to transfer the IAB node 315-a and child IAB nodes 315-c and 315-d and the UE 115-c, the IAB donor node 310 may transmit correlated context transfer requests for the various context transfers. Various techniques for explicitly indicating such correlation, or providing information based on which a correlation can be inferred by a target donor node, are described herein. Accordingly, the IAB node 315-a, the child IAB nodes 315-c and 315-d, and the UE 115-c may be migrated from the IAB donor node 310 to the second donor node while maintaining continuous connectivity.

Figure 4:
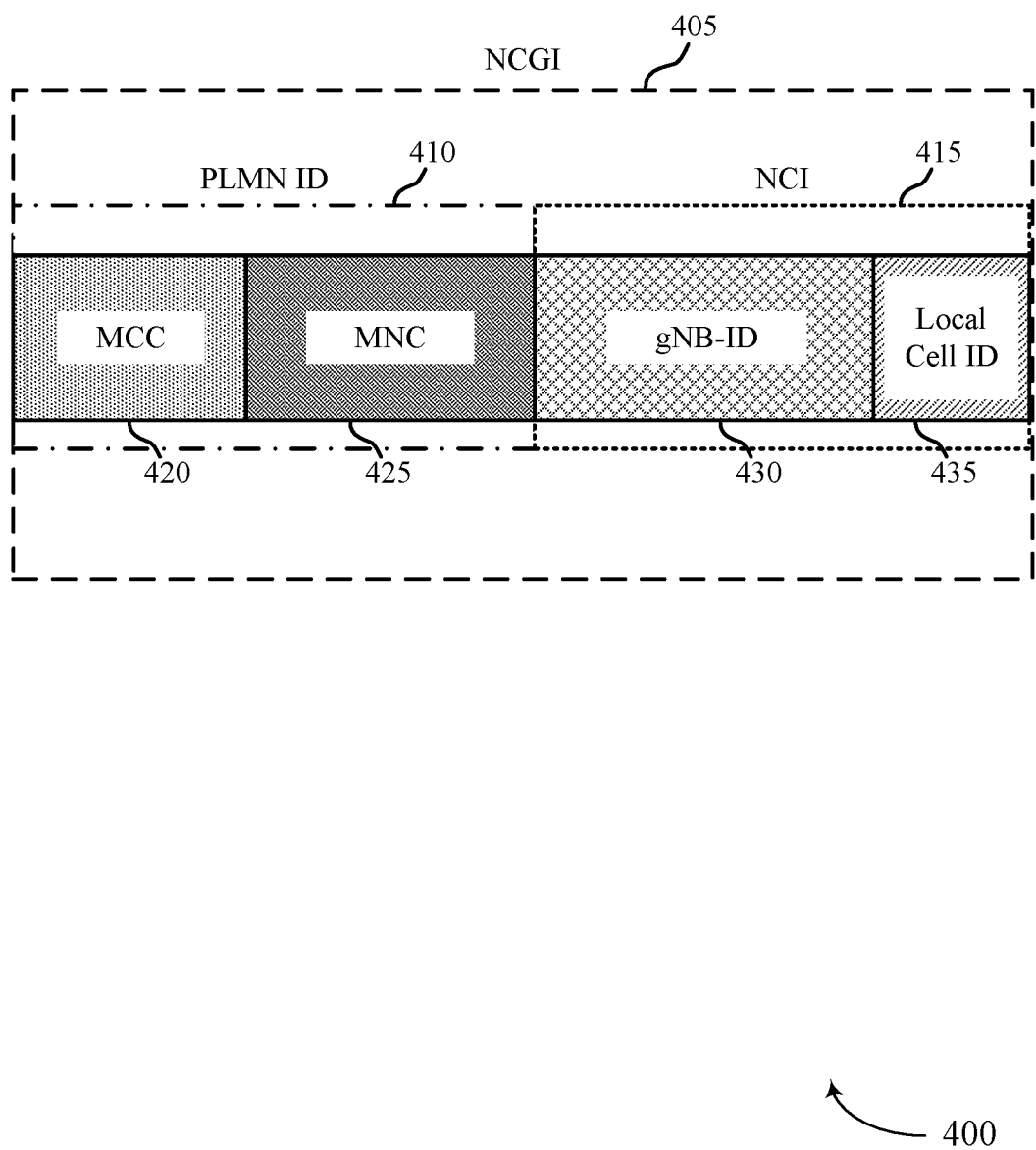
FIG. 4 illustrates an example of a global identifier format that supports enhanced context transfer of an IAB node in accordance with aspects of the present disclosure.

FIG. 4 illustrates an example of a global identifier format 400 that supports enhanced context transfer of an IAB node in accordance with aspects of the present disclosure. In some examples, the global identifier format 400 may implement aspects of the wireless communications systems 100, 200, or 300. For example, the global identifier format 400 may be associated with a cell or an IAB node (e.g., an IAB node as described with reference to FIG. 2 and FIG. 3). In other words, the global identifier format 400 may be an identification for the IAB node or for its respective cell.

In an NR network, such as an IAB network, an NR cell may be assigned an NCGI 405. In an IAB network, a cell served by a DU of an IAB donor node or an IAB relay node may be identified by an NCGI 405. The NCGI 405 may include a Public Land Mobile Network (PLMN) ID 410 and an NR cell identity (NCI). In some examples, the PLMN ID 410 may include a total of 24 bits between a mobile country code (MCC) 420 and a mobile network code (MNC) 425. For example, the MCC 420 may include 12 bits and the MNC 425 may include 12 bits. The MCC 420 may identify the country in which a cell is operating, and the MNC 425 may identify the network within the country. The NCI 415 may include 36 bits. In some examples, the leftmost 22 to 33 bits (e.g., the higher priority or most significant bits) may form a gNB-ID 430, and the remaining bits (e.g., the lower priority or less significant bits) may be a local cell ID 435. The gNB-ID 430 may be unique for a given gNB and thus may be common for all cells served by that gNB. In other words, the gNB-ID 430 may be common for all cells served by a CU of a donor node DU, and any cells served by DUs of descendent IAB nodes. Together, the PLMN ID 410 and the gNB-ID 430 may globally identify a base station.

In some examples, in addition to an NCGI 405, a cell supported by a DU may have a PCI. A PCI may identify a cell's geographic location. However, in some cases, a PCI may not be unique. For example, there may be different options for PCI values supported by the network (e.g., in an NR system, a PCI may have 1008 total supported values). Thus, due to the limited number of values, a PCI may be reused by multiple geographically separated cells in a network. In such cases, cells with the same PCI may be distinguished from one another by their unique Cell Global Identifiers (CGIs). In the case of NR networks, cells with the same PCI may be distinguished by different NCGIs 405. A PCI may be carried by the primary synchronization signal (PSS) or the secondary synchronization signal (SSS) in a synchronization signal block (SSB).

In some cases, signals or physical channels may be scrambled (e.g., signals from multiple UEs 115 to a base station 105 or an IAB node or an IAB donor node, etc., may be interleaved or multiplexed in time or frequency). A PCI may be used to determine a scrambling sequence of many physical signals or physical channels (e.g., a scrambling seed). A PCI may be used as a scrambling seed for some types of transmissions (e.g., physical broadcast channel (PBCH), physical downlink control channel (PDCCH)

CoreSet0, or cell-specific physical downlink shared channel (PDSCH) transmissions). In some channels and transmission types, a PCI or a different scrambling seed may be used. The PCI may be used to determine a scrambling sequence for one or more physical signals or physical channels.

In some examples, a migrating node may have a new NCGI 405, PCI, or both. For instance, if a UE 115 or a relay IAB node migrates from one cell to another, the NCGI 405 for the new cell, the PCI for the new cell, or both, may be different from the NCGI 405, PCI, or both, of the source cell. In such examples, the NCGI 405, the PCI, or both, may be known or generated by a DU of a serving IAB node. However, if the serving IAB node is a descendent device of a new donor node, the new donor node may be unaware of the NCGI 405, the PCI, or both, of the target cell. In some cases, the new donor node may be aware of the updated NCGI 405, PCI, or both, but the old donor node (e.g., the source donor node), may not be aware of the target NCGI 405, PCI, or both. In such examples, the source donor node, the target donor node, or both, may not be able to successfully complete a migration procedure (e.g., a handover procedure) for descendent devices and IAB nodes from a migrating relay node, without knowledge of the target NCGI 405, PCI, or both. To increase the likelihood of successful migration procedures for downstream or descendent devices and IAB nodes, a source donor node may provide information indicative of a correlation between context transfers to the target donor node.

Figure 5:
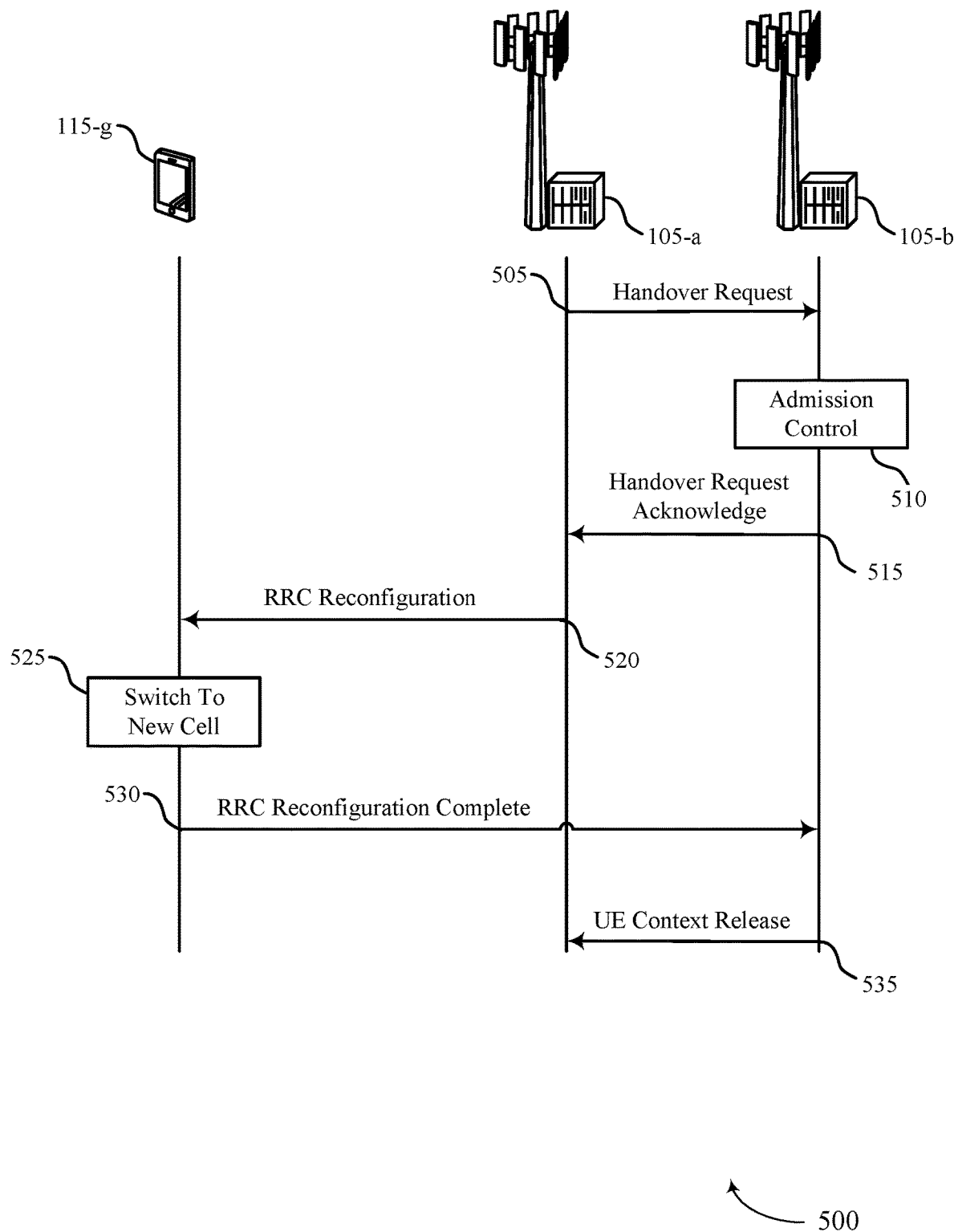
FIG. 5 illustrates an example of a process flow that supports enhanced context transfer of an IAB node in accordance with aspects of the present disclosure.

FIG. 5 illustrates an example of a process flow 500 that supports enhanced context transfer of an IAB node in accordance with aspects of the present disclosure. The process flow 500 may include a UE 115-g, a source base station 105-a, and a target base station 105-b, which may be examples of corresponding devices described herein, including with reference to FIGS. 1 through 3. For example, the base station 105-a may be an example of an IAB node (e.g., a source donor node), and the base station 105-b may be an example of another IAB node (e.g., a target donor node). Each of the base station 105-a and the base station 105-b may include a CU in communication with a core network. Alternative examples of the following may be implemented, where some steps may be performed in a different order than described or not performed at all. In some implementations, steps may include additional features not mentioned below, or further steps may be added.

The base stations 105-a and 105-b may support cell deployments on different coverage areas or cells. The UE 115-g and the source base station 105-a may have an established connection, and may communicate over a communication link. The UE 115-g may be configured in an RRC connected state (e.g., an RRC_CONNECTED state). In some cases, the source base station 105-a may determine to transfer a child node or device to another base station. For example, the UE 115-g may experience degraded signal quality or reduced signal power due to signaling interference or mobility within the wireless communication system. The source base station 105-a in communication with the UE 115-g may determine to perform handover of the UE 115-g from the source base station 105-a to the target base station 105-b in accordance with a handover procedure. The handover procedure may involve the source base station 105-a sending a handover request message in preparation for handover of the UE 115-g to the target base station 105-b.

At 505, the source base station 105-a may initiate a handover procedure and transmit a handover request message (e.g., via an Xn interface) to the target base station 105-g. In some cases, the decision to perform the handover may be triggered by a measurement report transmitted by the UE 115-g. For example, the UE 115-g may measure one or more channels to monitor channel quality of other channels. The measurement report may indicate another channel, coverage area, cell, base station, IAB node, etc., has higher quality than the current serving channel, coverage area, cell, base station, IAB node, etc. Based on the measurement report, the source base station 105-a may transmit the handover message.

At 510, the target base station 105-b may perform admission control to determine if the handover request is allowable. For example, base station 105-b may determine if there are enough resources available to serve the UE 115-g. In some cases, the target base station 105-b may determine an RRC configuration for the UE 115-g to use for communicating with the target base station 105-b.

At 515, the target base station 105-b may admit the UE 115-g and may transmit a handover request acknowledgement message. The handover request acknowledgement message may include the RRC configuration determined by the target base station 105-b. For example, the configuration may indicate a reconfiguration of at least one radio bearer for communications with the target base station 105-b. In some cases, the response may include an indication of a handover command to be transmitted from source base station 105-a to the UE 115-g at 520.

At 520, the source base station 105-a may transmit the handover command to the UE 115-g indicating the RRC configuration to be used for handover. The handover command may include instructions to release a connection with base station 105-a and initiate a connection with base station 105-b.

At 525, the UE 115-g may move the RRC connection to the target cell served by the target base station 105-b. For example, the UE 115-g may initiate a random access channel (RACH) procedure with the target cell. The UE 115-g may reconfigure its radio bearers for communication with the target base station 105-b.

At 530, the UE 115-g may transmit an RRC Reconfiguration Complete message to the target cell, e.g., after the RACH procedure.

At 535, the target base station 105-b may indicate (e.g., via an RRC reconfiguration or grant) to the source base station 105-a that the handover was successful. Base station 105-b may transmit a UE context release message, indicating that base station 105-a is to release a connection with UE 115-g.

However, as described with reference to FIG. 6, in some examples, an IAB node may perform a handover procedure (or other migration procedure), instead of the UE 115-g. An IAB node may be a parent node, a relay node, or the like, and may serve one or more UEs 115, child nodes, or other relay nodes which in turn serve one or more descendent IAB nodes or devices, or the like. Regardless of the order in which such context transfers and migration procedures are performed, they may result in failed context transfers, lost connections, increased system latency, and the like, for descendent devices and IAB nodes. Thus, the base station 105-a may transmit multiple context transfer requests for multiple devices or IAB nodes that are descendants of the migrating IAB node (e.g., in one or more handover requests as illustrated at 505) to the base station 105-b, and may indicate a correlation between the context transfer requests.

Figure 6:
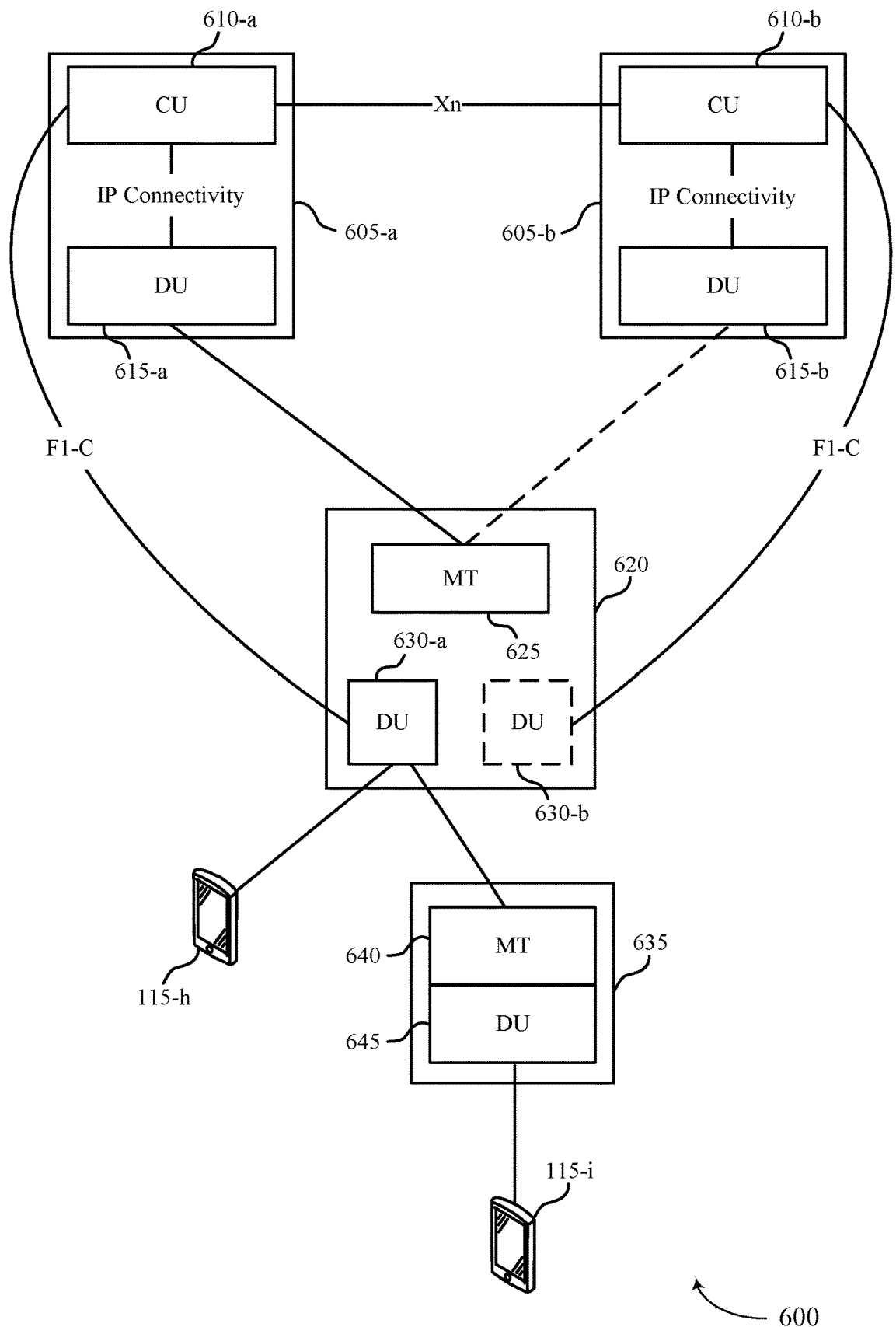
FIG. 6 illustrates an example of a wireless communications system that supports enhanced context transfer of an IAB node in accordance with aspects of the present disclosure.

FIG. 6 illustrates an example of a wireless communications system 600 that supports enhanced context transfer of an IAB node in accordance with aspects of the present disclosure. In some examples, the wireless communications system 600 may implement aspects of the wireless communications systems 100, 200, or 300. The wireless communications system 600 may be an example of an IAB system or network (e.g., as described with reference to FIG. 2). The wireless communications system 600 may include IAB donor nodes 605-*a* and 605-*b*, which may be examples of the IAB donor nodes 205-*a* as described with reference to FIG. 2. The wireless communications system 600 may also include IAB relay nodes 620 and 635, which may be examples of other IAB nodes 205 as described with reference to FIG. 2.

The IAB donor node 605-*a* may include a CU 610-*a* and a DU 615-*a*, which may be in communication via IP connectivity. The DU 615-*a* may communicate with an MT 625 of the IAB relay node 620 as part of an IAB network (e.g., an NR network). The IAB relay node 620 may also include a DU 630-*a*. In some cases, the IAB relay node 620 may communicate with one or more child devices or nodes. For example, the DU 630-*a* may communicate with an MT 640 of the IAB relay node 635 (which may function as a child node for the IAB relay node 620) and with a UE 115-*h*. The IAB relay node 635 may be a leaf node, and may communicate with a UE 115-*i* via a DU 645.

As described herein, a donor node (e.g., the IAB donor node 605-*a*) may determine to transfer (e.g., via a context transfer) a relay node (e.g., the IAB relay node 620) to a second donor node (e.g., the IAB donor node 605-*b*). For example, the IAB donor node 605-*a* may perform a migration procedure (e.g., a handover procedure, secondary node addition procedure, secondary node modification procedure, secondary node change procedure, or the like) to migrate the IAB relay node 620 to the IAB donor node 605-*b*. The IAB donor node 605-*b* may include a CU 610-*b* and a DU 615-*b*. However, as the IAB relay node 620 serves downstream devices including the UE 115-*h*, the IAB relay node 635, and the UE 115-*i* (via the IAB relay node 635), the IAB donor nodes 605-*a* and 605-*b* may also perform a migration procedure for each downstream device.

As an example, the CU 610-*a* may determine to perform a context transfer for the MT 625 of the IAB relay node 620. The CU 610-*a* may also migrate the DU 630-*a* of the IAB relay node 620. However, migration of the DU 630-*a* may include a change in NCGI or PCI of cells served by the DU 630-*a*. In such cases, the NCGI or PCI of downstream devices (e.g., the UE 115-*h*, the IAB relay node 635, and the UE 115-*i*) may also change. For instance, the UE 115-*h* may be handed over from a cell of the IAB relay node 620 with a first NCGI or PCI associated with the DU 630-*a* (e.g., which is connected to the CU 610-*a*), to a second cell supported by the same IAB relay node 620 but associated with a second NCGI or PCI associated with the DU 630-*b* (e.g., which is connected to a CU 610-*b*). That is, a DU function (e.g., the DU 630) may change based on a cell it serves, a physical location, or the like. Thus, an NCGI or PCI or both for the DU 630-*b* (e.g., the DU function of the IAB relay node 620 if connected to the CU 610-*a*) may be different than the NCGI, PCI, or both for the DU 630-*a* (e.g., the DU function of the IAB relay node 620 if connected to the CU 610-*b*).

In some examples, performing a migration procedure for the MT 625 prior to attempting a migration procedure for downstream devices and nodes may result in a broke source path to one or more of the UE 115-*h*, the IAB relay node 635, and the UE 115-*i*. For instance, the CU 610-*a* may first perform a context transfer for the MT 625, followed by a handover procedure of the MT 625 (with a handover of the DU 630-*a* to the DU 630-*b* following as a result of the handover of the MT 625). However, having already performed a handover procedure for the MT 625, the CU 610-*a* may have lost a source path to descendent devices such as the UE 115-*h* and the IAB relay node 635. That is, the CU 610-*a* may no longer be able to communicate with descendent devices via the MT 625 or the DU 630-*a*. Thus, having lost the source path to descendent devices and IAB nodes of the IAB relay node 620, the CU 610-*a* will be unable to perform a successful context transfer or handover procedure with the UE 115-*h*, the IAB relay node 635, or the UE 115-*i*.

One or both donor nodes performing the context transfer may not have knowledge of the change in NCGI/PCI, which may result incomplete or failed context transfers one or more of the UE 115-*h*, the IAB relay node 635, the UE 115-*i*, or any combination thereof. A cell ID for a descendent device may change, or may stay the same, but may be subsequently changed for the CU 610-*b*, but may initially remain the same and unknown to the CU 610-*b*. For example, at the time of a context transfer for the IAB relay node 620, a cell identifier for a descendent device or node may remain the same. After performing the context transfer request, the cell ID of, for instance, the UE 115-*h* for the CU 610-*b* may change. But at the time of the context transfer of the IAB relay node 620, the CU 610-*b* may not be aware of the cell for the UE 115-*i*. This may occur because prior to the context transfer for the MT 625 of the IAB relay node 620, the DU 630-*b* of the IAB relay node 620 may not have an F1-C connection to the CU 610-*b*. Thus, the CU 610-*b* may not be aware of cells configured on the DU 630-*b* of the IAB relay node 620.

Thus, whether the cell ID for the IAB relay node 620 changes, if the CU 610-*a* indicates the cell as a target cell for the UE 115-*h* or the MT 640, without knowledge of the cell ID, the CU 610-*b* may understand that the cell will be discovered later (e.g., when F1-C connection is setup between the DU 630-*b* and the CU 610-*b* after a context transfer for the MT 625 of the IAB relay node 620. In order for the CU 610-*b* to determine whether the UE 115-*h* or the MT 640 will be served by a cell that is on the DU 630-*b* of the IAB relay node 620 (e.g., but which the CU 610-*b* does not yet know and will discover later in time), the context transfer requests may be correlated. Thus, when a new F1-C connection is set up between the DU 630-*b* and the CU 610-*b*, the DU 630-*b* of the IAB relay node 620 may indicate to the CU 610-*b* the cells it was originally serving. The CU 610-*b* may already be familiar with or have identified these cells because of the combined context transfers. The CU 610-*b* may determine to reconfigure the identified cells on the DU 630-*b* and change an NCGI or PCI or both for the cells, which it may be able to do upon setup of the F1-C connection with the DU 630-*b*. Therefore, combining or correlating the context transfers may allow the CU 610-*b* to infer the topology of the migrating subtree (e.g., the IAB relay node 620, the IAB relay node 635, the UE 115-*h*, and the UE 115-*i*) even before an F1-C connection is setup between the CU 610-*b* and the DUs of the relay nodes of the subtree.

For example, if the CU 610-*a* and the CU 610-*b* first perform an MT context transfer for the MT 625, and then attempt to perform a context transfer for one or more downstream devices of the IAB relay node 620, the context transfer for the downstream devices may be incomplete because the CU 610-*a* and the CU 610-*b* may not know the target NCGI for (for instance) the UE 115-*i*. The UE 115-*i* may have changed its physical location or a cell by which it is served or both. Although the IAB relay node 635 may be aware of the target NCGI, the CU 610-*a* and the CU 610-*b* may not be aware of this information. Thus, a context transfer for the UE 115-*i* (or any other downstream devices, such as the IAB relay node 635 and the UE 115-*h*), may be incomplete or unsuccessful. In such examples, the UE 115-*i* may expend valuable resources and battery power attempting to maintain or regain a lost connection, establishing a new connection, etc., resulting in increased system latency, increased system congestion, decreased battery power, and decreased user experience.

To enable continuous communication without failed context transfers or handovers, the CU 610-*a* may indicate that context transfers of the descendent devices of the IAB relay node 620 are correlated to the context transfer for the IAB relay node 620. Having indicated such correlation, the CU 610-*a* and the CU 610-*b* may successfully perform migration procedures for the IAB relay node 620 and all descendent devices and nodes without losing the source path to such devices or failing to complete the procedures based on a lack of relevant information for downstream cells.

For example, the CU 610-*a* of the IAB donor node 605-*a* may transmit (e.g., via an X2 interface, an Xn interface, or the like), to the CU 610-*b* of the IAB donor node 605-*b*, a context transfer request message for the IAB relay node 620. The CU 610-*a* may include an indication that the context transfer request is associated with the MT 625 of the IAB relay node 620. The CU 610-*a* may also transmit, to the CU 610-*b* via the Xn interface, a context transfer request for one or more descendant devices or nodes for the IAB relay node 620. For instance, the CU 610-*a* may provide a context transfer request for the UE 115-*h*, a context transfer request for the IAB relay node 635 (e.g., a child node), and a context transfer request for the UE 115-*i*. The context transfer requests may be part of the same message or may be sent separately. In either example, the context transfer request messages may be transmitted as part of a handover request message, a secondary node addition request message, as secondary node change required message, a secondary node modification request message, or the like (e.g., depending on the type of migration procedure being performed by the CU 610-*a* and the CU 610-*b*).

The CU 610-*a* may indicate a correlation between the context transfer of the MT 625 and one or more additional context transfers (e.g., the context transfer of the UE 115-*h*). The correlation may indicate, for example, that the UE 115-*h* is a child device of the IAB relay node 620. In some cases, the correlation may be indicated via a migration procedure identifier included into the first context transfer, the second context transfer, or both. For instance, the identifier may be a label associated with the first context transfer request, a device identifier associated with the child device (e.g., the UE 115-*h*), a device identifier associated with the IAB relay node 620 (e.g., associated with base station interface communications between the first IAB donor node 605-*a* and the second IAB donor node 605-*b*, such as an NG-RAN node UE application protocol ID reference), or a combination thereof.

Additionally, or alternatively, the identifier may include address information allocated to the IAB relay node 620 (e.g., by the second IAB donor node 605-*b*, such as an internet protocol (IP) address or backhaul adaptation protocol (BAP) address). In some examples, the CU 610-*a* may include such an identifier in the second context transfer request (e.g., for the UE 115-*h*). The presence of such an identifier may indicate to the CU 610-*b* that the context transfer requests are correlated. For instance, if the identifier is a value also included in the first context transfer request (e.g., a label associated with the correlated context transfer requests, a device identifier of the UE 115-*h* or the IAB relay node 620, or the like), the CU 610-*b* may determine that the context transfer requests are correlated. Or, if all of the context transfer requests are included in a single context transfer request message, the CU 610-*b* may determine that all included context transfer requests are correlated.

In some examples, the CU 610-*b* may provide information to the CU 610-*a*, which may be used by the CU 610-*a* as a migration procedure identifier. For instance, the CU 610-*b* may provide routing identifiers for the IAB relay node 620 such as an IP address or BAP address allocated by the CU 610-*b* to the IAB relay node 620. In some examples, the CU 610-*b* may provide this information autonomously, or based on one or more rules. In some examples, the CU 610-*a* may request this information from the CU 610-*b*, receive it from the CU 610-*b*, and may generate the second context transfer request to include the requested routing information. Upon receiving the first context transfer request for the IAB relay node 620 and the second transfer request that includes routing information associated with the IAB relay node 620, the CU 610-*b* may determine that the first and second context transfer requests are correlated.

In some cases, the CU 610-*a* may transmit an additional context transfer request message for each child device of the IAB relay node 620. For example, the CU 610-*a* may transmit a context transfer request for the UE 115-*h*, the MT 640 of the IAB relay node 635, and the UE 115-*i*. The one or more additional context transfer requests may be transmitted in a single message or in any number of separate messages. For example, a first message may include context transfer requests for the IAB relay node 620 and the UE 115-*h*, and the context transfer request messages for the IAB relay node 635 and the UE 115-*i* may be transmitted in separate messages different from the first message. Alternatively, each context transfer request may be sent in a separate message. In some cases, the CU 610-*a* may include (e.g., with the first context transfer request message) an indication of subsequent context transfer request messages to be transmitted. For example, the CU 610-*a* may indicate that there will be one or more additional context transfer requests in a separate message. In some cases, the CU 610-*a* may include a count indicating the number of upcoming context transfer requests correlated with the first context transfer request, or the number of context transfer requests that were previously transmitted in correlation with the first context transfer request. Additionally or alternatively, the CU 610-*a* may indicate (e.g., in a first context transfer request or a second context transfer request) that no subsequent context transfer requests are pending.

In some examples, the CU 610-*b* may have an upper limit for a maximum number of context transfer requests it is capable of processing in a single message. The CU 610-*b* may transmit an indication of the maximum number to the CU 610-*a* autonomously or based on one or more rules. In some examples, the CU 610-*a* may request the indication of the maximum number from the CU 610-*b*, and the CU 610-*b* may transmit the maximum number to the CU 610-*a* based on the request. In either case, the CU 610-*a* may configure the context transfer requests accordingly. As an example, the CU 610-*b* may indicate a maximum number of two context transfer requests per message. The CU 610-*a* may thus include context transfer requests for the IAB relay node 620 and the UE 115-*h* in a first message, and may include context transfer requests for the IAB relay node 635 (e.g., the child node) and the UE 115-*i* in a second message.

In cases in which the IAB relay node 620 is connected to child devices or nodes (e.g., the UE 115-*g*, the IAB relay node 635, and the UE 115-*i*), the CU 610-*a* may include (e.g., with the first context transfer request message) a depth value associated with the context transfer request. The depth value may indicate a number of hops in a chain of nodes relative to the IAB relay node 620. For example, the CU 610-*a* may include, in the context transfer request message for the MT 625 of the IAB relay node 620, a depth value of two, indicating that there are two additional levels of downstream devices to be transferred. Thus, the CU 610-*b* may infer the number of additional context transfer requests that may be transmitted from the CU 610-*a*. In some examples, the CU 610-*b* may be limited in the depth value it can handle in a single message. The CU 610-*b* may autonomously indicate a maximum depth value to the CU 610-*a*, or the CU 610-*a* may request the maximum depth value from the CU 610-*b*. The CU 610-*a* may then configure the context transfer request messages accordingly. In some examples, the first context transfer request may indicate a total count of context transfer requests that are or will be correlated (e.g., a total count of four correlated context transfer requests for the IAB relay node 620, the UE 115-*h*, the IAB relay node 635, and the UE 115-*i*). In some examples, the first context transfer request may indicate a combination of hop count and total count (e.g., a hop count of two with a total count of four). The CU 610-*b* may use such information to identify and prepare for all correlated context transfer requests.

In some examples, the correlation between context transfers may be indicated via a cell identifier (e.g., an NCGI, PCI, etc.). For example, the CU 610-*a* may include, with the second context transfer request, a cell identifier (e.g., a target NCGI) associated with the IAB donor node 605-*a*. The CU 610-*b* may then infer that the second context transfer is associated with the first context transfer (e.g., because the first context transfer includes the same cell identifier). In such examples, the target indicated cell may be configured on the DU 630-*b*.

In some examples, the CU 610-*a* may include, in the second context transfer request message, a cell identifier associated with the CU 610-*b* for a cell that is not served by the IAB donor node 605-*b*. The CU 610-*b* may use the cell identifier that it does not serve to infer that the second context transfer request is associated with the first. In some examples, the CU 610-*b* may provide a list of cell identifiers served by the IAB donor node 605-*b*. The CU 610-*a* may request the list of cell identifiers served by the IAB donor node 605-*b*, and the CU 610-*b* may provide them responsive to the request. Upon receiving the list of cell identifiers, the CU 610-*a* may identify a cell not included in the list (e.g., a cell of a downstream device such as the UE 115-*i*), and may indicate the target NCGI for the identified cell. In some examples, the CU 610-*b* may provide the list of cell identifiers based on an indication from the CU 610-*a*, (e.g., an indication that the first context transfer request is for the MT 625 of the IAB relay node 620, or that upcoming correlated context transfers are pending, or the like).

Upon receiving the one or more context transfer request messages, the CU 610-*b* may identify the migration procedure identifier and determine that the context transfers are correlated. For example, the CU 610-*b* may receive a first context transfer request message including a migration procedure identifier. The CU 610-*b* may receive a second context transfer request message including the same migration procedure identifier, and may determine that the first and second context transfer request messages are correlated. Alternatively, the CU 610-*b* may identify a migration procedure identifier in the second context transfer request message that corresponds to the first context transfer request message or to the CU 610-*a* or the IAB relay node 620 (e.g., where the first context transfer request message does not include an identifier), and may infer correlation based thereon.

The CU 610-*b* may transmit acknowledgment feedback to the CU 610-*a* after receiving the one or more context transfer request messages and determining their correlation. The acknowledgment feedback for each context transfer request may be transmitted in a single message or in multiple messages. For example, the CU 610-*b* may acknowledge, in a single message, reception of context transfer requests sent in separate messages or multiple context transfer requests included in a single message. In some examples, the CU 610-*b* may provide an acknowledgement message for each context transfer request message received. The CU 610-*b* may transmit a separate acknowledgment message for each context transfer request message received, regardless of whether the context transfer requests were sent in a single message or separate messages, or may transmit a single acknowledgment message for all received correlated context transfer requests. If the CU 610-*b* transmits multiple acknowledgement messages (e.g., one for each received context transfer request message), the CU 610-*b* may refrain from transmitting acknowledgment feedback until all correlated context transfer requests are received (e.g., until a total number of correlated context transfer requests are received as indicated by the first context transfer request, or until a final context transfer request indicates that no more context transfer requests are to be transmitted). In some cases, the CU 610-*b* may transmit an acknowledgement feedback message after each received context transfer request message, regardless of whether subsequent correlated context transfer request are to be transmitted. In any case, each acknowledgement message may be transmitted as a handover request acknowledgement message, a secondary node addition request acknowledgement message, a secondary node change required acknowledgement message, a secondary node modification request acknowledgement message, or the like (e.g., depending on the migration procedure being performed for the IAB relay node 620).

In some cases, the CU 610-*a* may be capable of receiving a limited number of acknowledgement messages in a single message. The CU 610-*a* may transmit, to the CU 610-*b*, an indication of the maximum number of acknowledgement messages it is capable of processing in a single message. In some examples, the CU 610-*b* may request the indication of the maximum number from the CU 610-*a*. The CU 610-*b* may configure the acknowledgement messages based on the indication.

After the CU 610-*a* receives the one or more acknowledgement feedback messages from the CU 610-*b*, the CU 610-*a* may transmit, to the IAB relay node 620, a reconfiguration message. The reconfiguration message may instruct the IAB relay node 620 to establish a connection with the IAB donor node 605-*b*. In some examples, the reconfiguration message may instruct the IAB relay node 620 to release a connection with the IAB donor node 605-*a*. The CU 610-*b* may transmit a message to the CU 610-*a* with instructions to release the connection with the IAB relay node 620, and any descendant devices or child nodes. The connections may be RRC connections, FI-C connections, or both.

Figure 7:
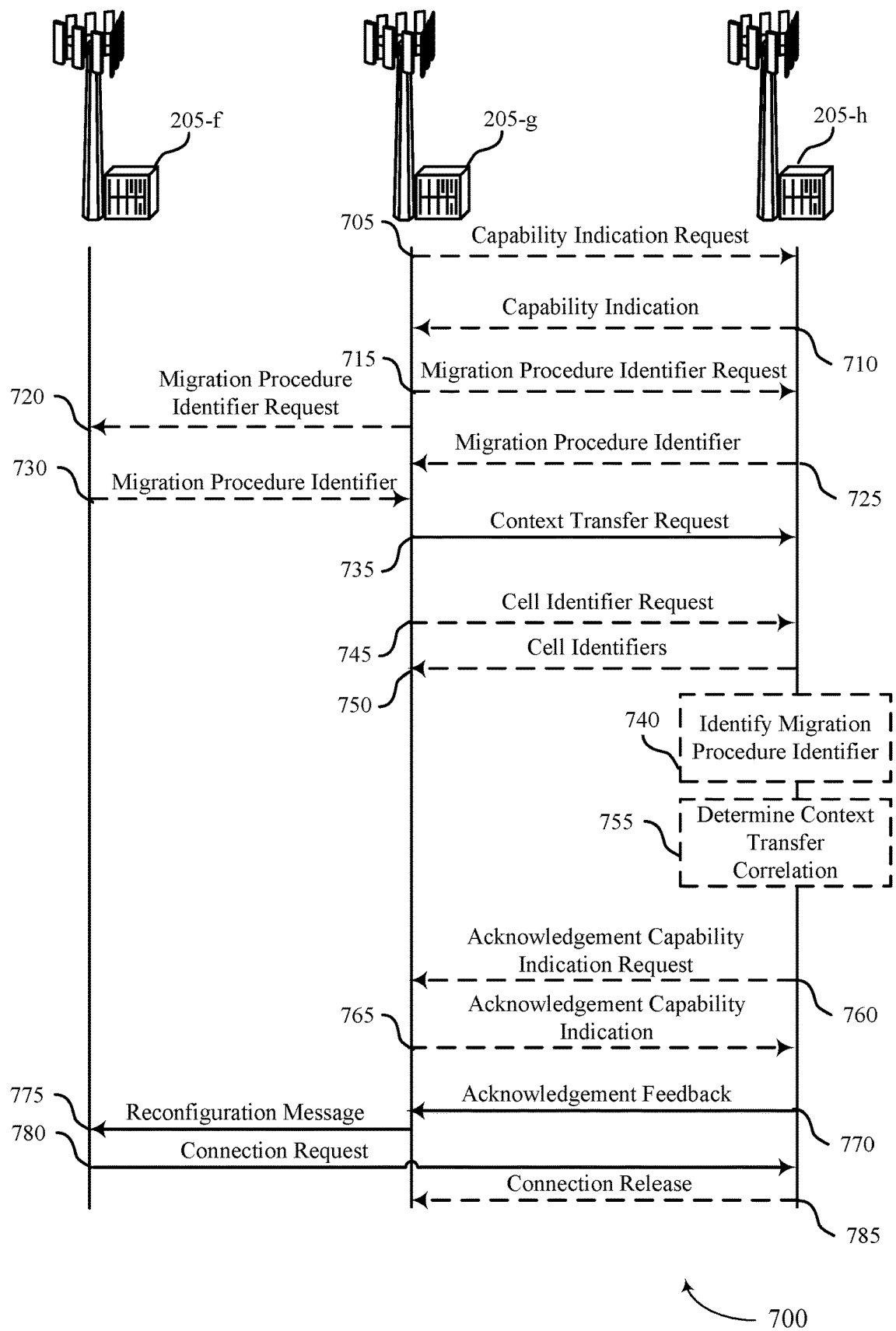
FIG. 7 illustrates an example of a process flow that supports enhanced context transfer of an IAB node in accordance with aspects of the present disclosure.

FIG. 7 illustrates an example of a process flow 700 that supports enhanced context transfer of an IAB node in accordance with aspects of the present disclosure. The process flow 700 may include nodes 205-*f*, 205-*g*, and 205-*h*, which may be examples of corresponding devices described herein, including with reference to FIGS. 1 through 6. For example, the node 205-*f* may be an example of a relay node as described with reference to FIGS. 3 and 6. In some cases, the relay node 205-*f* may serve one or more child nodes or devices. Nodes 205-*g* and 205-*h* may be examples of a first and second donor node, respectively, as described with reference to FIG. 6. The relay node 205-*f* may be a child node of the donor node 205-*g*. Alternative examples of the following may be implemented, where some steps may be performed in a different order than described or not performed at all. In some implementations, steps may include additional features not mentioned below, or further steps may be added.

At 705, the donor node 205-*g* may determine to transfer (e.g., via a handover procedure or other migration procedure) the relay node 205-*f* to the donor node 205-*h*. In cases in which the relay node 205-*f* is in communication with one or more child nodes or devices, the donor node 205-*g* may also transfer any descendant nodes or devices of the relay node 205-*f* to the donor node 205-*h*. In such cases, the donor node 205-*g* may transmit context transfer requests for the relay node 205-*f* and one or more descendant nodes in a single message or multiple messages. However, the donor node 205-*h* may have a limit on the maximum number of corresponding context transfer request messages it is capable of processing in a single message. As such, at 710, the donor node 205-*h* may transmit an indication of the maximum number (e.g., autonomously or based on one or more rules or standardized procedures). In some examples, at 705, the donor node 205-*g* may request an indication of the maximum number from the donor node 205-*h*, and, at 710, the donor node 205-*h* may transmit the indication of the maximum number responsive to the request received at 705.

At 715, the donor node 205-*g* may transmit, to the donor node 205-*h*, a message requesting an indication of a migration procedure identifier. The migration procedure identifier may be, for example, a routing identifier for the relay node 205-*f*, such as an IP address or BAP address information allocated to the relay node 205-*f* by the donor node 205-*h*. Such routing identification information may be included in a context transfer request at 735, as described herein.

At 720, the donor node 205-*g* may transmit, to the relay node 205-*f*, a message requesting an indication of a migration procedure identifier. The migration procedure identifier may be, for example, a routing identifier for the relay node 205-*f*, such as an IP address or BAP address information allocated to the relay node 205-*f* by the donor node 205-*h*. Such routing identification information may be included in a context transfer request at 735, as described herein. In some examples, the donor node 205-*g* may either request the routing information from either the donor node 205-*h* or the relay node 205-*f* (e.g., but not from both).

At 725, (e.g., responsive to the request received at 715) the donor node 205-*h* may determine and transmit an indication of the migration procedure identifier. The migration procedure identifier may include the address information.

At 730, the relay node 205-*f* may transmit (e.g., responsive to the request received at 720), an indication of the migration procedure identifier to the donor node 205-*g*. The migration procedure identifier may include the address information.

At 735, the donor node 205-*g* may transmit one or more context transfer request messages for the relay node 205-*f* to the donor node 205-*h*. At least one context transfer request may be associated with an MT function of the relay node 205-*f*, and the donor node 205-*g* may indicate as the association in the context transfer request message. In cases in which the relay node 205-*f* is in communication with one or more child nodes or devices, the donor node 205-*g* may also transfer any descendant nodes of the relay node 205-*f* to the donor node 205-*h*, and may indicate a correlation between context transfer requests for the relay node 205-*f* and context transfer requests for descendent nodes and devices. Accordingly, at 735, the donor node 205-*g* may transmit an additional context transfer request for each descendent node of the relay node 205-*f*. For example, the relay node 205-*f* may serve one or more child nodes, and each child node may in turn serve additional child nodes or devices. In these cases, each context transfer request may be associated with a UE served by the relay node 205-*f*, an MT function of one or more child nodes served by the relay node 205-*f*, an MT function of an additional child node associated with a DU function of the one or more child nodes, or any combination thereof.

The context transfer requests for the relay node 205-*g* and the descendent nodes may be transmitted in the same or separate messages. For example, the donor node 205-*g* may transmit a first context transfer request message for the relay node 205-*f* and may transmit a second context transfer request for a child node of the relay node 205-*f* in a separate message. Alternatively, the donor node 205-*g* may transmit the context transfer requests for both the relay node 205-*f* and the child node in the same message. In cases in which the relay node 205-*f* has additional child nodes or devices, the donor node 205-*g* may transmit a context transfer request for each additional child node or device with the first context transfer request message, the second context transfer request message, or one or more additional context transfer request messages.

For example, if the context transfer requests for the relay node 205-*f* and the first child node are sent in the same message, the donor node 205-*g* may include context transfer requests for the additional descendant node(s) in the same message or in separate messages. If, instead, the context transfer request for the relay node 205-*f* and the first child node are sent in separate messages, the donor node 205-*g* may include context transfer requests for the additional descendant node(s) in the second context transfer request message (e.g., with the first child node context transfer request) or in one or more additional separate messages. Each context transfer request message may be a transmitted as a handover request message, a secondary node addition request message, as secondary node change required message, a secondary node modification request message, or the like.

If, at 710, the donor node 205-*h* indicated a maximum number of context transfer requests that the donor node 205-*h* is capable of receiving in a single message, the donor node 205-*g* may configure the number of context transfer request messages transmitted at 735 accordingly. For example, the donor node 205-*g* may include the first and second context transfer requests in a single message, or may transmit the first and second context transfer requests separately, based on the capacity indicated by the donor node 205-*h* at 710.

In some cases, the donor node 205-*g* may include, with the first context transfer request message transmitted at 735, an indication of one or more additional context transfer requests to be transmitted. In some other cases, an indication of the one or more additional context transfer requests may be transmitted in the second context transfer request message. For example, the first context transfer request message may include an indication of a number of subsequent context transfer requests corresponding to the first context transfer request (e.g., the second context transfer request). In some examples, the donor node 205-g may include (e.g., in the second context transfer request message) an indication of the number of previously transmitted context transfer request messages (e.g., a number of previously transmitted context transfer requests or context transfer request messages that correspond to the second context transfer request). The donor node 205-g may also include an indication (e.g., in the first context transfer request or the second context transfer request) that no subsequent context transfer requests are pending. For example, if the relay node 205-f serves a single UE 115, then the first context transfer request (e.g., in a first message) may indicate one subsequent context transfer request (e.g., for the descendent UE 115), or a total of two correlated context transfer requests. A second context transfer request (e.g., in a second message), may include an indication of one previously transmitted context transfer request (e.g., in the first message), or may include an indication that no subsequent correlated context transfer requests are to be transmitted by the donor node 205-g, or both.

In some cases, the donor node 205-g may include a migration procedure identifier in the first or second context transfer request to indicate a correlation between first and second context transfer requests. The migration procedure identifier may be based on an indication (e.g., included with the first context transfer request message) that the first context transfer request message is associated with an MT function of the relay node 205-f. The migration procedure identifier may be a label included in the first context transfer, an identifier for the child UE 115 or MT function of a child node corresponding to the second context transfer, or the like. The migration procedure identifier may be an identifier of the relay node 205-f used by the donor node 205-g and the donor node 205-h (e.g., such that the donor node 205-h may determine that correlated context transfer requests are all related to the same relay node 205-f). The migration procedure identifier may be address information as indicated at 725 or 730. The donor node 205-g may include the migration procedure identifier in the second context transfer request message transmitted at 735 and, in some cases, in any additional context transfer request messages associated with the first or second context transfer requests.

In some examples, the donor node 205-g may include a cell identifier in the second transfer request message. The cell identifier may be associated with the donor node 205-g for a cell that is served by the donor node 205-g. The donor node 205-h may infer that the second context transfer request message is associated with the first context transfer request message (e.g., because the first context transfer request message includes the same cell identifier).

In some examples, the donor node 205-g may include (e.g., with the first context transfer request message) a depth value indicating a number of hops in a chain of nodes that includes the relay node 205-f and any child nodes of the relay node 205-f. The depth value may indicate a number of hops in a chain of nodes relative to the relay node 205-f. For example, the donor node 205-g may indicate a depth value of two, indicating that there are two additional levels of downstream devices to be transferred. The donor node 205-h may infer the number of additional context transfer requests that may be transmitted from the donor node 205-g. In some examples, the donor node 205-h may be limited in the depth value it can handle in a single message. The donor node 205-h may indicate a maximum depth value the donor node 205-g, or the donor node 205-g may request the maximum depth value from the donor node 205-h. The donor node 205-g may configure the context transfer request messages accordingly.

At 740, after receiving one or more context transfer request messages, the donor node 205-h may identify the migration procedure identifier included in one or more of the context transfer request messages. For example, the donor node 205-h may identify a migration procedure identifier in the second context transfer request message that corresponds to the first context transfer request message. If, at 725, the donor node 205-h transmitted an indication of a migration procedure identifier to the donor node 205-g, identifying the migration procedure identifier at 740 may be based on the indication.

In some examples, the migration procedure identifier may be a cell identifier not served by the donor node 205-h. For instance, at 745, the donor node 205-g may transmit, to the donor node 205-h, a request for a list of cell identifiers served by the donor node 205-h. At 750, the donor node 205-h may transmit, to the donor node 205-g (e.g., responsive to the request at 745 or autonomously or based on one or more standardized rules), the list of cell identifiers served by the donor node 205-h. The donor node 205-g may determine, based on the list of cell identifiers, a cell identifier associated with the donor node 205-h that is not served by the donor node 205-h, and may include the cell identifier with a second context transfer request message.

In some examples, at 750, the donor node 205-h may transmit a cell identifier for the donor node 205-g to use in subsequent context transfer request messages, e.g., regardless of whether the donor node 205-g requests a cell identifier list at 745. The donor node 205-h may determine the cell identifier to transmit at 750 based on an indication from the donor node 205-g, e.g., that the first context transfer request is for an MT of the relay node 205-f, or that upcoming correlated context transfers are pending.

At 755, the donor node 205-h may use the migration procedure identifiers identified at 740 to determine that the context transfers are correlated. For example, the donor node 205-h may receive a second context transfer request message including a migration procedure identifier that matches a migration procedure identifier included in the first context transfer request message, and may determine that the first and second context transfer request messages are correlated. Alternatively, the donor node 205-h may identify a migration procedure identifier in the second context transfer request message that corresponds to the first context transfer request message (e.g., where the first context transfer request message does not include an identifier).

After receiving the one or more context transfer request messages, the donor node 205-h may transmit acknowledgement feedback corresponding to each context transfer request message. However, the donor node 205-g may have a limit on the maximum number of acknowledgement messages it can receive in a single message (e.g., due to processing limitations). At 765, the donor node 205-g may transmit, to the donor node 205-h, an indication of a number of acknowledgement messages the donor node 205-g is capable of receiving in a single message. The donor node 205-h may autonomously transmit the number of acknowledgement messages it is capable of receiving and processing in a single message, or may do so based on one or more standardized rules. In some cases, at 760, the donor node 205-h may request capability information including the maximum number of acknowledgement messages the donor node 205-g is capable of receiving in a single message. In such examples, at 765, the donor node 205-g may transmit the capability information responsive to the request at 760.

At 770, the donor node 205-h may transmit, to the donor node 205-g, one or more acknowledgement feedback messages corresponding to the context transfer request messages. The donor node 205-h may configure the acknowledgement feedback messages according to the capability indication transmitted at 765. The acknowledgment feedback for each context transfer request may be transmitted in a single message or in multiple messages. For example, the donor node 205-h may acknowledge, in a single message, reception of context transfer requests sent in separate messages or a single message. Or, the donor node 205-h may transmit a separate acknowledgment message for each context transfer request message received in a single message or received in multiple messages. Each acknowledgement message may be transmitted as a handover request acknowledgement message, a secondary node addition request acknowledgement message, a secondary node change required acknowledgement message, a secondary node modification request acknowledgement message, or the like.

At 775, the donor node 205-g may transmit a reconfiguration message to the relay node 205-f. The reconfiguration message may include instructions for the relay node 205-f and the one or more child nodes to establish a connection with the donor node 205-h. The reconfiguration message may further include instructions for the relay node 205-f and the one or more child nodes to release a connection with the donor node 205-g.

At 780, the relay node 205-f may transmit, to the donor node 205-h, a connection message requesting to establish a first connection with the donor node 205-h. The connection request message may be based on the acknowledgement feedback transmitted to the donor node 205-g at 770. The connection request message may also include a request to establish a connection with the donor node 205-h for the one or more child nodes or devices of the relay node 205-f.

At 785, the donor node 205-h may transmit, to the donor node 205-g, a connection release message. The connection release message may instruct the donor node 205-g to release a connection with the relay node 205-f. In some cases, the connection release message may also instruct the donor node 205-g to release a connection with the one or more child devices of the relay node 205-f. The connection release message may be based on the connection request message received at 780.

Thus, as described herein, by correlating the various context transfer requests, the donor node 205-g and the donor node 205-h may successfully migrate the relay node 205-f and any descendent relay nodes, child nodes, or child devices.

Figure 8:
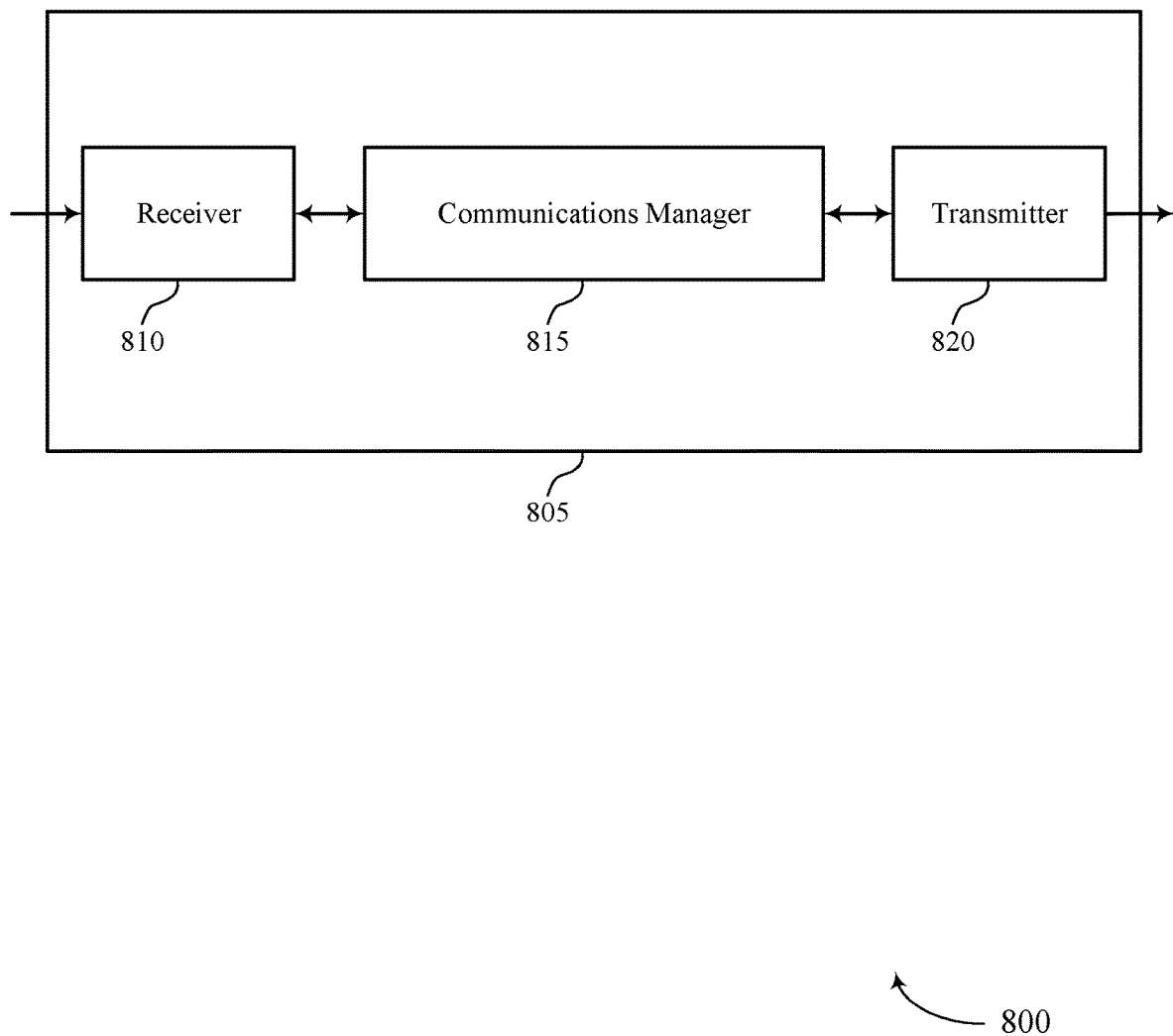
FIGS. 8 and 9 show block diagrams of devices that support enhanced context transfer of an IAB node in accordance with aspects of the present disclosure.

FIG. 8 shows a block diagram 800 of a device 805 that supports enhanced context transfer of an IAB node in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to enhanced context transfer of an IAB node, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a second donor node, a first context transfer request and a second context transfer request, the first context transfer request associated with an MT function of a relay node, and the second context transfer request corresponding to the first context transfer request and associated with one or more child nodes of the relay node, receive, from the second donor node, acknowledgement feedback responsive to the first context transfer request and the second context transfer request, and transmit, to the relay node based on receiving the acknowledgement feedback, one or more reconfiguration messages including an instruction for the one or more child nodes and the relay node to establish a first connection with the second donor node (e.g., one reconfiguration message per node or UE 115).

The communications manager 815 may also receive, from a first donor node, a first context transfer request and a second context transfer request, the first context transfer request associated with an MT function of a relay node, and the second context transfer request corresponding to the first context transfer request and associated with one or more child nodes of the relay node, transmit, to the first donor node, acknowledgement feedback responsive to the first context transfer request and the second context transfer request, and receive, from the relay node based on transmitting the acknowledgement feedback for the first context transfer request and the second context transfer request to the first donor node, a connection message requesting to establish a first connection with the second donor node for the relay node and the one or more child nodes. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
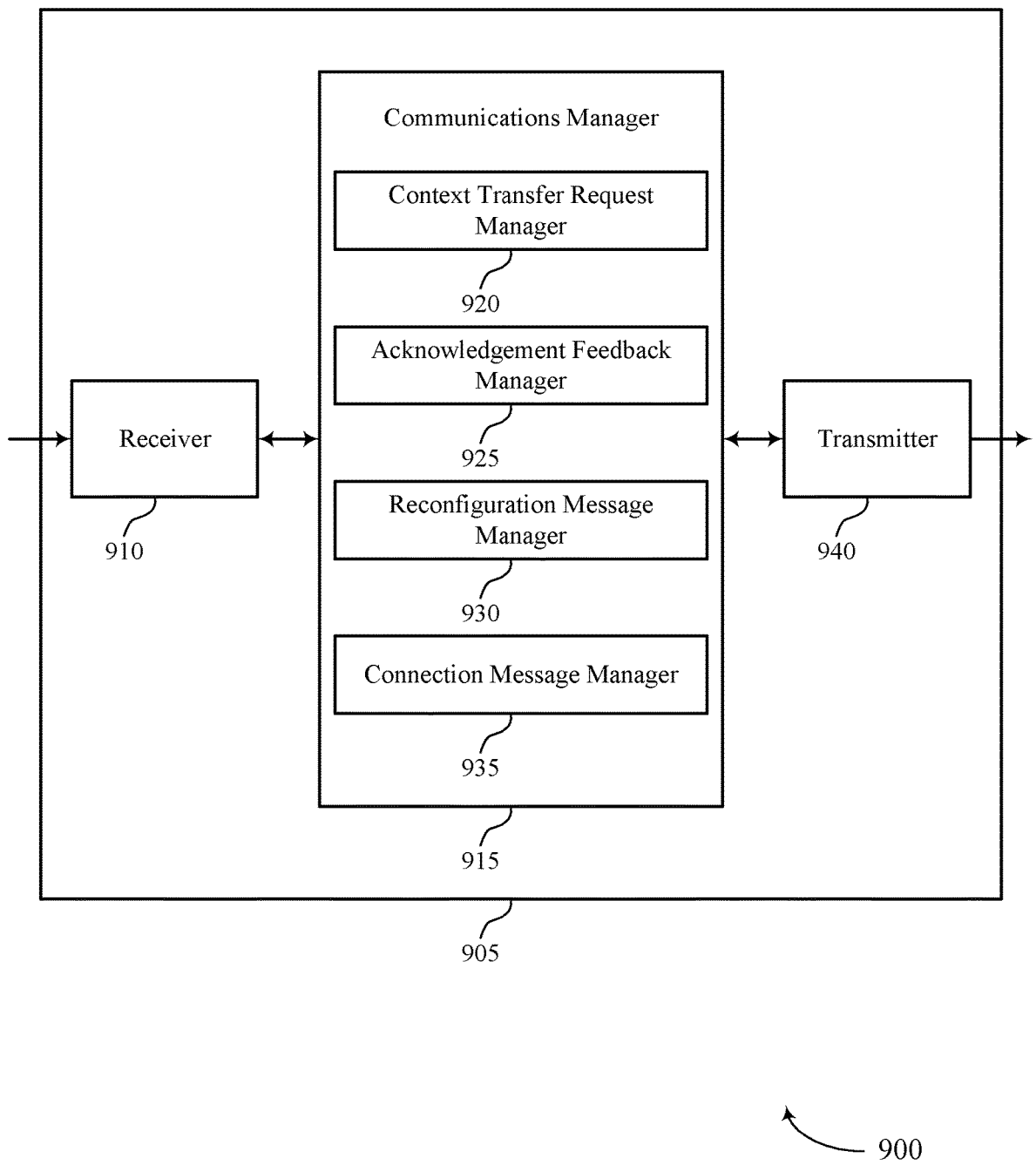

FIG. 9 shows a block diagram 900 of a device 905 that supports enhanced context transfer of an IAB node in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to enhanced context transfer of an IAB node, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a context transfer request manager 920, an acknowledgement feedback manager 925, a reconfiguration message manager 930, and a connection message manager 935. The communications manager 915 may be an example of aspects of the communications manager 1110 described herein.

The context transfer request manager 920 may transmit, to a second donor node, a first context transfer request and a second context transfer request, the first context transfer request associated with an MT function of a relay node, and the second context transfer request corresponding to the first context transfer request and associated with one or more child nodes of the relay node. The acknowledgement feedback manager 925 may receive, from the second donor node, acknowledgement feedback responsive to the first context transfer request and the second context transfer request. The reconfiguration message manager 930 may transmit, to the relay node based on receiving the acknowledgement feedback, one or more reconfiguration messages including an instruction for the one or more child nodes and the relay node to establish a first connection with the second donor node.

The context transfer request manager 920 may receive, from a first donor node, a first context transfer request and a second context transfer request, the first context transfer request associated with an MT function of a relay node, and the second context transfer request corresponding to the first context transfer request and associated with one or more child nodes of the relay node. The acknowledgement feedback manager 925 may transmit, to the first donor node, acknowledgement feedback responsive to the first context transfer request and the second context transfer request. The connection message manager 935 may receive, from the relay node based on transmitting the acknowledgement feedback for the first context transfer request and the second context transfer request to the first donor node, a connection message requesting to establish a first connection with the second donor node for the relay node and the one or more child nodes.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
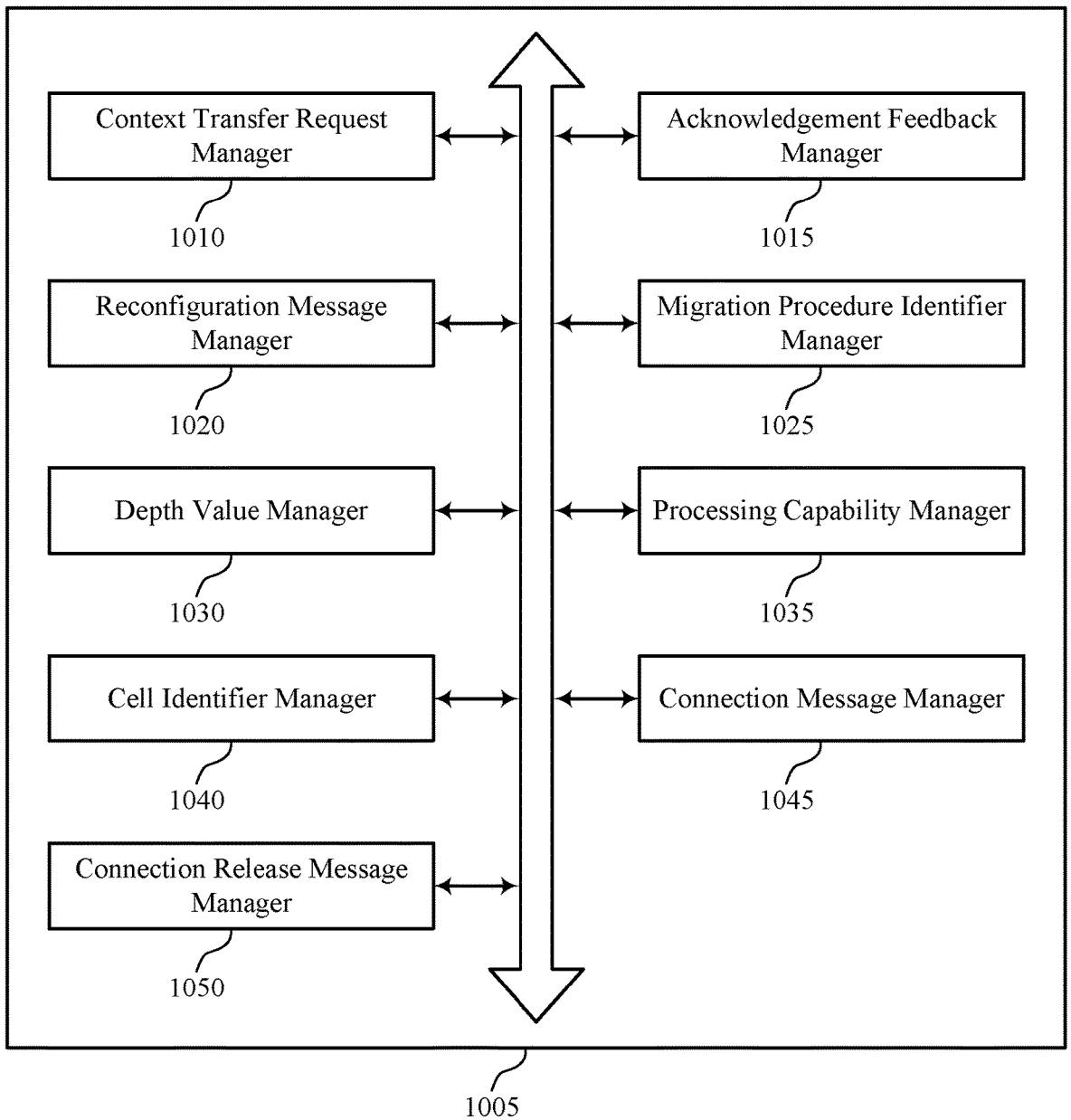
FIG. 10 shows a block diagram of a communications manager that supports enhanced context transfer of an IAB node in accordance with aspects of the present disclosure.

FIG. 10 shows a block diagram 1000 of a communications manager 1005 that supports enhanced context transfer of an IAB node in accordance with aspects of the present disclosure. The communications manager 1005 may be an example of aspects of a communications manager 815, a communications manager 915, or a communications manager 1110 described herein. The communications manager 1005 may include a context transfer request manager 1010, an acknowledgement feedback manager 1015, a reconfiguration message manager 1020, a migration procedure identifier manager 1025, a depth value manager 1030, a processing capability manager 1035, a cell identifier manager 1040, a connection message manager 1045, and a connection release message manager 1050. Each of these modules may communicate, directly or indirectly, with one another (e.g., via one or more buses).

The context transfer request manager 1010 may transmit, to a second donor node, a first context transfer request and a second context transfer request, the first context transfer request associated with an MT function of a relay node, and the second context transfer request corresponding to the first context transfer request and associated with one or more child nodes of the relay node. In some examples, the context transfer request manager 1010 may receive, from a first donor node, a first context transfer request and a second context transfer request, the first context transfer request associated with an MT function of a relay node, and the second context transfer request corresponding to the first context transfer request and associated with one or more child nodes of the relay node.

In some examples, the context transfer request manager 1010 may transmit a single message including the first context transfer request and the second context transfer request. In some examples, the context transfer request manager 1010 may transmit a first message including the first context transfer request. In some examples, the context transfer request manager 1010 may transmit a second message including the second context transfer request.

In some examples, the context transfer request manager 1010 may transmit, to the second donor node, a third context transfer request corresponding to the second context transfer request, the third context transfer request associated with an MT function of one or more additional child nodes of the relay node, one or more additional child nodes associated with DU functions of the one or more child nodes, or a combination thereof. In some examples, the context transfer request manager 1010 may include, in the first context transfer request, an indication of one or more context transfer requests to be transmitted. In some examples, the context transfer request manager 1010 may include, in a first message including the first context transfer request, an indication of a number of one or more subsequent context transfer requests corresponding to the first context transfer request, the one or more subsequent context transfer requests including the second context transfer request.

In some examples, the context transfer request manager 1010 may include, in a second message including the second context transfer request, an indication of a number of one or more previously transmitted context transfer requests corresponding to the second context transfer request. In some examples, the context transfer request manager 1010 may include, in the first context transfer request or the second context transfer request, an indication that no subsequent context transfer requests are pending. In some examples, the context transfer request manager 1010 may include, in the first message, an indication that the first context transfer request is associated with the MT function of the relay node, where receiving the migration procedure identifier from the second donor node is based on the indication that the first context transfer request is associated with the MT function of the relay node. In some examples, the context transfer request manager 1010 may include, in the first context transfer request message, an indication of one or more context transfer requests to be transmitted, where receiving the migration procedure identifier from the second donor node is based on the indication of subsequent context transfer requests.

In some examples, the context transfer request manager 1010 may receive a single message including the first context transfer request and the second context transfer request.

In some examples, the context transfer request manager 1010 may receive a first message including the first context transfer request. In some examples, the context transfer request manager 1010 may receive a second message including the second context transfer request. In some examples, the context transfer request manager 1010 may receive, from the first donor node, a third context transfer request corresponding to the second context transfer request, the third context transfer request associated with an MT function of one or more additional child nodes of the relay node, one or more additional child nodes associated with DU functions of the one or more child nodes, or a combination thereof. In some examples, the context transfer request manager 1010 may identify, in the first context transfer request, an indication of one or more context transfer requests to be transmitted.

In some examples, the context transfer request manager 1010 may identify, in a first message including the first context transfer request, an indication of a number of the one or more context transfer requests to be transmitted corresponding to the first context transfer request, the one or more subsequent context transfer requests including the second context transfer request. In some examples, the context transfer request manager 1010 may identify, in a second message including the second context transfer request, an indication of a number of one or more previously transmitted context transfer requests corresponding to the second context transfer request. In some examples, the context transfer request manager 1010 may identify, in the first context transfer request or the second context transfer request, an indication that no subsequent context transfer requests are pending.

In some examples, the context transfer request manager 1010 may identify, in the first message, an indication that the first context transfer request is associated with the MT function of the relay node, where transmitting the migration procedure identifier to the first donor node is based on the indication that the first context transfer request is associated with the MT function of the relay node. In some examples, the context transfer request manager 1010 may identify, in the first message, an indication of one or more context transfer requests to be transmitted, where transmitting the migration procedure identifier from the second donor node is based on the indication of the one or more context transfer requests to be transmitted.

In some cases, the single message is a handover request message, a secondary node addition request message, a secondary node change required message, or a secondary node modification request message. In some cases, the first message is a handover request message, a secondary node addition request message, or a secondary node modification request message. In some cases, the second message is a handover request message, a secondary node addition request message, a secondary node change required message, or a secondary node modification request message. In some cases, a single message includes the first context transfer request, the second context transfer request, and the third context transfer request.

In some cases, a first message includes the first context transfer request and the second context transfer request, and a second message includes the third context transfer request. In some cases, a first message includes the first context transfer request, a second message includes the second context transfer request, and a third message includes the third context transfer request.

In some cases, a first message includes the first context transfer request, and where the indication of the one or more context transfer requests to be transmitted includes the second context transfer request in the first message. In some cases, a first message includes the first context transfer request, and the indication of the one or more context transfer requests to be transmitted includes the second context transfer request in a second message.

In some cases, the one or more child nodes include UEs served by the relay node, one or more UEs served by descendant relay nodes of the relay node, MT functions of one or more additional relay nodes served by the relay node, MT functions of one or more descendant relay nodes of the relay node, or a combination thereof. In some cases, the single message is a handover request message, a secondary node addition request message, a secondary node change required message, or a secondary node modification request message. In some cases, the first message is one of a handover request message, a secondary node addition request message, or a secondary node modification request message, and where the second message is one of a handover request message, a secondary node addition request message, a secondary node change required message, or a secondary node modification request message. In some cases, a first message includes the first context transfer request, the second context transfer request, and the third context transfer request. In some cases, a first message includes the first context transfer request and the second context transfer request, and where a second message includes the third context transfer request.

In some cases, a first message includes the first context transfer request, a second context transfer request includes the second context transfer request, and a third message includes the third context transfer request.

In some cases, a first message includes the first context transfer request, and the indication of the one or more context transfer requests to be transmitted includes the second context transfer request in the first message.

In some cases, the one or more child nodes include UEs served by the relay node, one or more UEs served by descendant relay nodes of the relay node, MT functions of one or more additional relay nodes served by the relay node, MT functions of one or more descendant relay nodes of the relay node, or a combination thereof.

The acknowledgement feedback manager 1015 may receive, from the second donor node, acknowledgement feedback responsive to the first context transfer request and the second context transfer request. In some examples, the acknowledgement feedback manager 1015 may transmit, to the first donor node, acknowledgement feedback responsive to the first context transfer request and the second context transfer request. In some examples, the acknowledgement feedback manager 1015 may receive an acknowledgement message including acknowledgement feedback for the first context transfer request and acknowledgement feedback for the second context transfer request.

In some examples, the acknowledgement feedback manager 1015 may receive a first acknowledgement message including acknowledgement feedback for the first context transfer request. In some examples, the acknowledgement feedback manager 1015 may receive a second acknowledgement message including acknowledgement feedback for the second context transfer request.

In some examples, the acknowledgement feedback manager 1015 may transmit an acknowledgement message including acknowledgement feedback for the first context transfer request and acknowledgement feedback for the second context transfer request.

In some examples, the acknowledgement feedback manager 1015 may transmit a first acknowledgement message including acknowledgement feedback for the first context transfer request. In some examples, the acknowledgement feedback manager 1015 may transmit a second acknowledgement message including acknowledgement feedback for the second context transfer request. In some cases, the acknowledgement message includes one of a handover request acknowledgement message, a secondary node addition request acknowledgement message, a secondary node modification request acknowledgment message, or a secondary node change confirmation message.

In some cases, the first acknowledgement message includes one of a handover request acknowledgement message, a secondary node addition request acknowledgement message, a secondary node modification request acknowledgment message, or a secondary node change confirmation message, and where the second acknowledgement message includes one of a handover request acknowledgement message, a secondary node addition request acknowledgement message, a secondary node modification request acknowledgment message, or a secondary node change confirmation message. In some cases, the acknowledgement message includes one of a handover request acknowledgement message, a secondary node addition request acknowledgement message, a secondary node modification request acknowledgment message, or a secondary node change confirmation message. In some cases, the first acknowledgement message includes one of a handover request acknowledgement message, a secondary node addition request acknowledgement message, a secondary node modification request acknowledgment message, or a secondary node change confirmation message, and where the second acknowledgement message includes one of a handover request acknowledgement message, a secondary node addition request acknowledgement message, a secondary node modification request acknowledgment message, or a secondary node change confirmation message.

The reconfiguration message manager 1020 may transmit, to the relay node based on receiving the acknowledgement feedback, one or more reconfiguration messages including an instruction for the one or more child nodes and the relay node to establish a first connection with the second donor node. The reconfiguration message manager 1020 may transmit, to the relay node based at least in part on receiving the acknowledgement feedback, one or more reconfiguration messages comprising an instruction for the one or more child nodes or the relay node or both to release one or more second connections with the first donor node, the relay node, or both.

The connection message manager 1045 may receive, from the relay node based on transmitting the acknowledgement feedback for the first context transfer request and the second context transfer request to the first donor node, a connection message requesting to establish a first connection with the second donor node for the relay node and the one or more child nodes.

The migration procedure identifier manager 1025 may include, in the second context transfer request, a migration procedure identifier corresponding to the first context transfer request, where receiving the acknowledgement feedback is based on the migration procedure identifier. In some examples, the migration procedure identifier manager 1025 may receive, from the second donor node or the relay node, an indication of the migration procedure identifier, where including the migration procedure identifier in the second context transfer request is based on receiving the indication of the migration procedure identifier. In some examples, the migration procedure identifier manager 1025 may transmit, to the second donor node or the relay node, a request for the indication of the migration procedure identifier, where receiving the indication of the migration procedure identifier from the second donor node or the relay node is based at least in part on transmitting the request for the indication of the migration procedure identifier.

In some examples, the migration procedure identifier manager 1025 may receive, from the second donor node responsive to transmitting a first message including the first context transfer request, a migration procedure identifier corresponding to the first context transfer request. In some examples, the migration procedure identifier manager 1025 may include the migration procedure identifier in a second message including the second context transfer request. In some examples, the migration procedure identifier manager 1025 may identify, in the second context transfer request, a migration procedure identifier corresponding to the first context transfer request, where transmitting the acknowledgement feedback is based on identifying the migration procedure identifier. In some examples, the migration procedure identifier manager 1025 may transmit, to the first donor node, an indication of the migration procedure identifier, where identifying the migration procedure identifier in the second context transfer request is based on transmitting the indication of the migration procedure identifier to the first donor node.

In some examples, the migration procedure identifier manager 1025 may receive, from the first donor node, a request for the indication of the migration procedure identifier, where transmitting the indication of the migration procedure identifier is based on receiving the request for the indication of the migration procedure identifier. In some examples, the migration procedure identifier manager 1025 may transmit, to the first donor node responsive to receiving a first message including the first context transfer request, a migration procedure identifier corresponding to the first context transfer request. In some examples, the migration procedure identifier manager 1025 may identify the migration procedure identifier in a second message including the second context transfer request. In some cases, the migration procedure identifier matches a second migration procedure identifier included in the first context transfer request, the second migration procedure identifier including a label associated with the first context transfer request, one or more device identifiers for the one or more child nodes, or a combination thereof.

In some cases, the migration procedure identifier includes a device identifier for the relay node, the device identifier associated with base station interface communications between the first donor node and the second donor node. In some cases, the migration procedure identifier includes address information allocated to the relay node by the second donor node. In some cases, the migration procedure identifier matches a second migration procedure identifier included in the first context transfer request, the second migration procedure identifier including a label associated with the first context transfer request, one or more device identifiers for the one or more child nodes, or a combination thereof. In some cases, the migration procedure identifier includes a device identifier for the relay node, the device identifier associated with base station interface communications between the first donor node and the second donor node. In some cases, the migration procedure identifier includes address information allocated to the relay node by the second donor node.

The depth value manager 1030 may include, in the first context transfer request, a depth value indicating a number of hops in a chain of nodes that includes the relay node and the one or more child nodes.

In some examples, the depth value manager 1030 may identify, in the first context transfer request, a depth value indicating a number of hops in a chain of nodes that includes the relay node and the one or more child nodes.

The processing capability manager 1035 may receive, from the second donor node, an indication of a maximum number of corresponding context transfer requests that the second donor node is capable of processing in a single message.

In some examples, the processing capability manager 1035 may configure, based on receiving the indication of the maximum number, a single message including the first context transfer request and the second context transfer request, or a first message including the first context transfer request and a second message including the second context transfer request. In some examples, the processing capability manager 1035 may transmit, to the second donor node, a request for the maximum number, where receiving the indication of the maximum number is based on transmitting the request for the maximum number. In some examples, the processing capability manager 1035 may transmit, to the second donor node, an indication of a maximum amount of acknowledgement feedback the first donor node is capable of processing in a single acknowledgement feedback message, where receiving the acknowledgement feedback responsive to the first context transfer request and the second context transfer request is based on transmitting the indication of the maximum amount of acknowledgement feedback.

In some examples, the processing capability manager 1035 may receive, from the second donor node, a request for the maximum amount of acknowledgement feedback, where transmitting the indication of the maximum amount of acknowledgement feedback is based on receiving the request for the maximum amount of acknowledgement feedback. In some examples, the processing capability manager 1035 may transmit, to the first donor node, an indication of a maximum number of corresponding context transfer requests that the second donor node is capable of processing in a single message, where receiving the first context transfer request and the second context transfer request is based on transmitting the indication of the maximum number. In some examples, the processing capability manager 1035 may receive, from the first donor node, a request for the maximum number, where transmitting the indication of the maximum number is based on receiving the request for the maximum number.

In some examples, the processing capability manager 1035 may receive, from the first donor node, an indication of a maximum amount of acknowledgement feedback the first donor node is capable of processing in a single acknowledgement feedback message, where transmitting the acknowledgement feedback responsive to the first context transfer request and the second context transfer request is based on receiving the indication of the maximum amount of acknowledgement feedback. In some examples, the processing capability manager 1035 may transmit, to the first donor node, a request for the maximum amount of acknowledgement feedback, where receiving the indication of the maximum amount of acknowledgement feedback is based on transmitting the request for the maximum amount of acknowledgement feedback. In some cases, a number of the one or more additional context transfer requests located in the first transfer request message exceeds a processing capability per received message for the second donor node.

The cell identifier manager 1040 may include, in the second context transfer request, a cell identifier that is associated with the first donor node for a cell served by a DU function of the relay node, where receiving the acknowledgement feedback responsive to the first context transfer request and the second context transfer request is based on including the cell identifier for the cell served by the DU of the relay node. In some examples, the cell identifier manager 1040 may include, in the second context transfer request, a cell identifier associated with the second donor node for a cell that is not served by the second donor node, where receiving the acknowledgement feedback responsive to the first context transfer request and the second context transfer request is based on including the cell identifier for the cell that is not served by the second donor node. In some examples, the cell identifier manager 1040 may transmit, to the second donor node, a request for a list of cell identifiers served by the second donor node.

In some examples, the cell identifier manager 1040 may receive, from the second donor node, the list of cell identifiers served by the second donor node, where including the cell identifier associated with the second donor node for the cell that is not served by the second donor node is based on receiving the list of cell identifiers served by the second donor node. In some examples, the cell identifier manager 1040 may identify, in the second context transfer request, a cell identifier that is associated with the first donor node for a cell served by the relay node.

In some examples, the cell identifier manager 1040 may determine, based on the cell identifier, that the second context transfer request corresponds to the first context transfer request, where transmitting the acknowledgement feedback responsive to the first context transfer request and the second context transfer request is based on determining that the second context transfer request corresponds to the first context transfer request. In some examples, the cell identifier manager 1040 may identify, in the second context transfer request, a cell identifier associated with the second donor node for a cell that is not served by the second donor node. In some examples, the cell identifier manager 1040 may determine, based on the cell identifier that is not served by the second donor node, that the second context transfer request corresponds to the first context transfer request, where transmitting the acknowledgement feedback responsive to the first context transfer request and the second context transfer request is based on determining that the second context transfer request corresponds to the first context transfer request.

In some examples, the cell identifier manager 1040 may receive, from the first donor node, a request for a list of cell identifiers served by the second donor node. In some examples, the cell identifier manager 1040 may transmit, to the first donor node, the list of cell identifiers served by the second donor node, where identifying the cell identifier associated with the second donor node for the cell that is not served by the second donor node is based on the list of cell identifiers served by the second donor node. The connection release message manager 1050 may transmit, to the first donor node based on receiving the connection message, a connection release message instructing the first donor node to release a second connection with the one or more child nodes.

Figure 11:
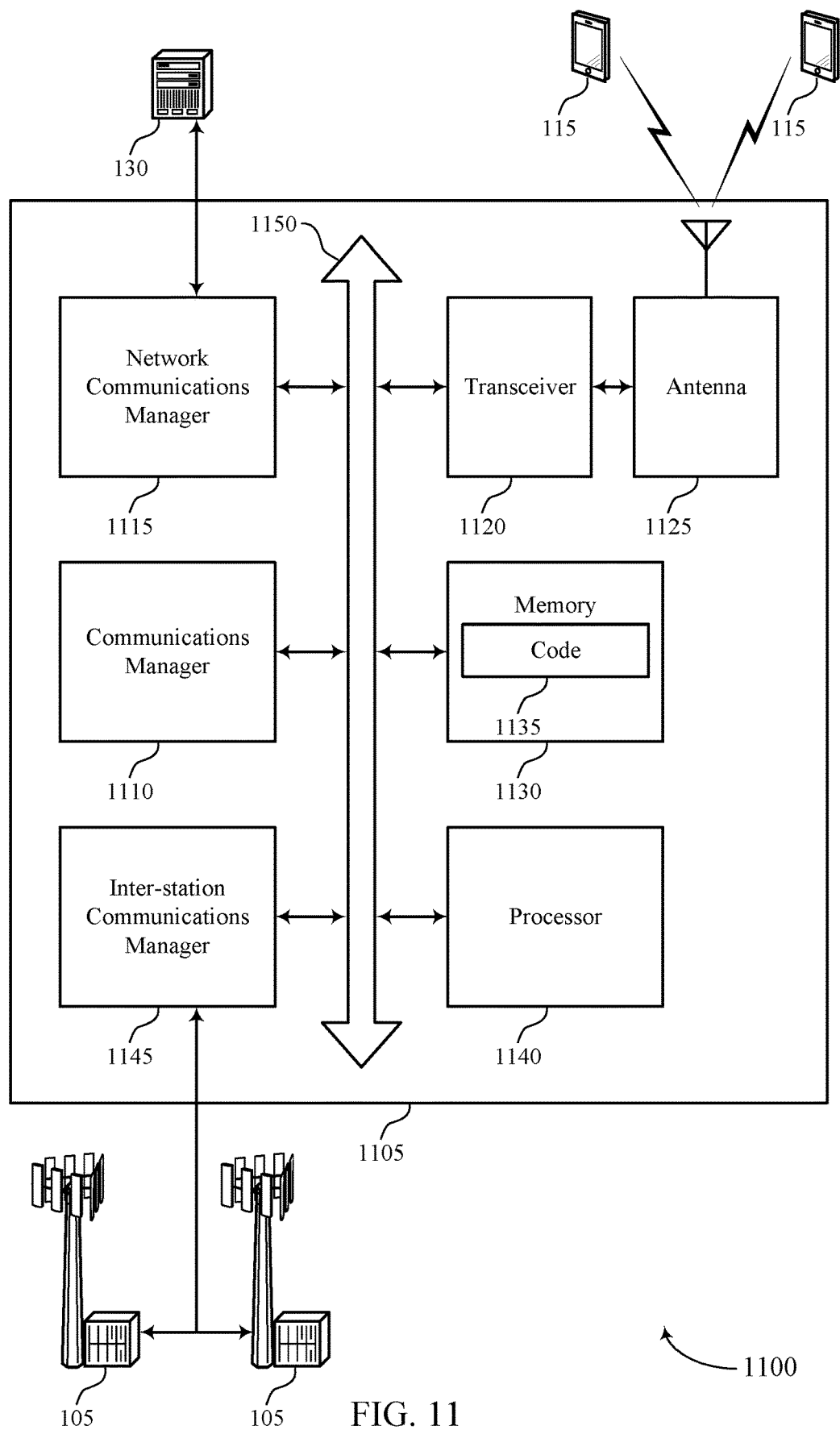
FIG. 11 shows a diagram of a system including a device that supports enhanced context transfer of an IAB node in accordance with aspects of the present disclosure.

FIG. 11 shows a diagram of a system 1100 including a device 1105 that supports enhanced context transfer of an IAB node in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a second donor node, a first context transfer request and a second context transfer request, the first context transfer request associated with an MT function of a relay node, and the second context transfer request corresponding to the first context transfer request and associated with one or more child nodes of the relay node, receive, from the second donor node, acknowledgement feedback responsive to the first context transfer request and the second context transfer request, and transmit, to the relay node based on receiving the acknowledgement feedback, one or more reconfiguration messages including an instruction for the one or more child nodes and the relay node to establish a first connection with the second donor node.

The communications manager 1110 may also receive, from a first donor node, a first context transfer request and a second context transfer request, the first context transfer request associated with an MT function of a relay node, and the second context transfer request corresponding to the first context transfer request and associated with one or more child nodes of the relay node, transmit, to the first donor node, acknowledgement feedback responsive to the first context transfer request and the second context transfer request, and receive, from the relay node based on transmitting the acknowledgement feedback for the first context transfer request and the second context transfer request to the first donor node, a connection message requesting to establish a first connection with the second donor node for the relay node and the one or more child nodes.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting enhanced context transfer of an IAB node).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
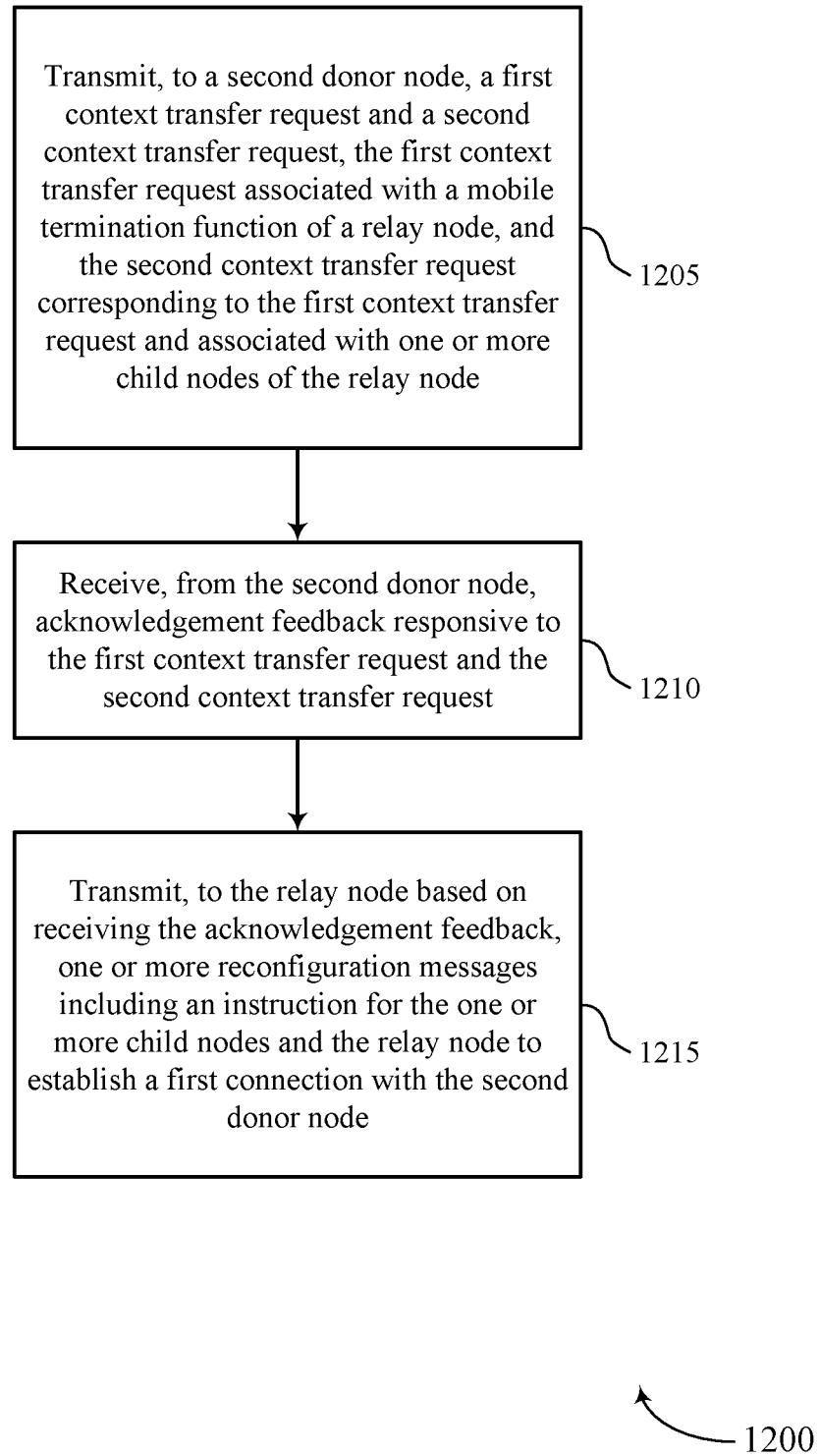
FIGS. 12 through 15 show flowcharts illustrating methods that support enhanced context transfer of an IAB node in accordance with aspects of the present disclosure.

FIG. 12 shows a flowchart illustrating a method 1200 that supports enhanced context transfer of an IAB node in accordance with aspects of the present disclosure. The operations of method 1200 may be implemented by a base station 105 or its components as described herein. For example, the operations of method 1200 may be performed by a communications manager as described with reference to FIGS. 8 through 11. In some examples, a first donor node or a base station may execute a set of instructions to control the functional elements of the first donor node or the base station to perform the functions described herein. Additionally or alternatively, a first donor node or a base station may perform aspects of the functions described herein using special-purpose hardware.

At 1205, the first donor node may transmit, to a second donor node, a first context transfer request and a second context transfer request, the first context transfer request associated with an MT function of a relay node, and the second context transfer request corresponding to the first context transfer request and associated with one or more child nodes of the relay node. The operations of 1205 may be performed according to the methods described herein. In some examples, aspects of the operations of 1205 may be performed by a context transfer request manager as described with reference to FIGS. 8 through 11.

At 1210, the first donor node may receive, from the second donor node, acknowledgement feedback responsive to the first context transfer request and the second context transfer request. The operations of 1210 may be performed according to the methods described herein. In some examples, aspects of the operations of 1210 may be performed by an acknowledgement feedback manager as described with reference to FIGS. 8 through 11.

At 1215, the first donor node may transmit, to the relay node based on receiving the acknowledgement feedback, one or more reconfiguration messages including an instruction for the one or more child nodes and the relay node to establish a first connection with the second donor node. The operations of 1215 may be performed according to the methods described herein. In some examples, aspects of the operations of 1215 may be performed by a reconfiguration message manager as described with reference to FIGS. 8 through 11.

Figure 13:
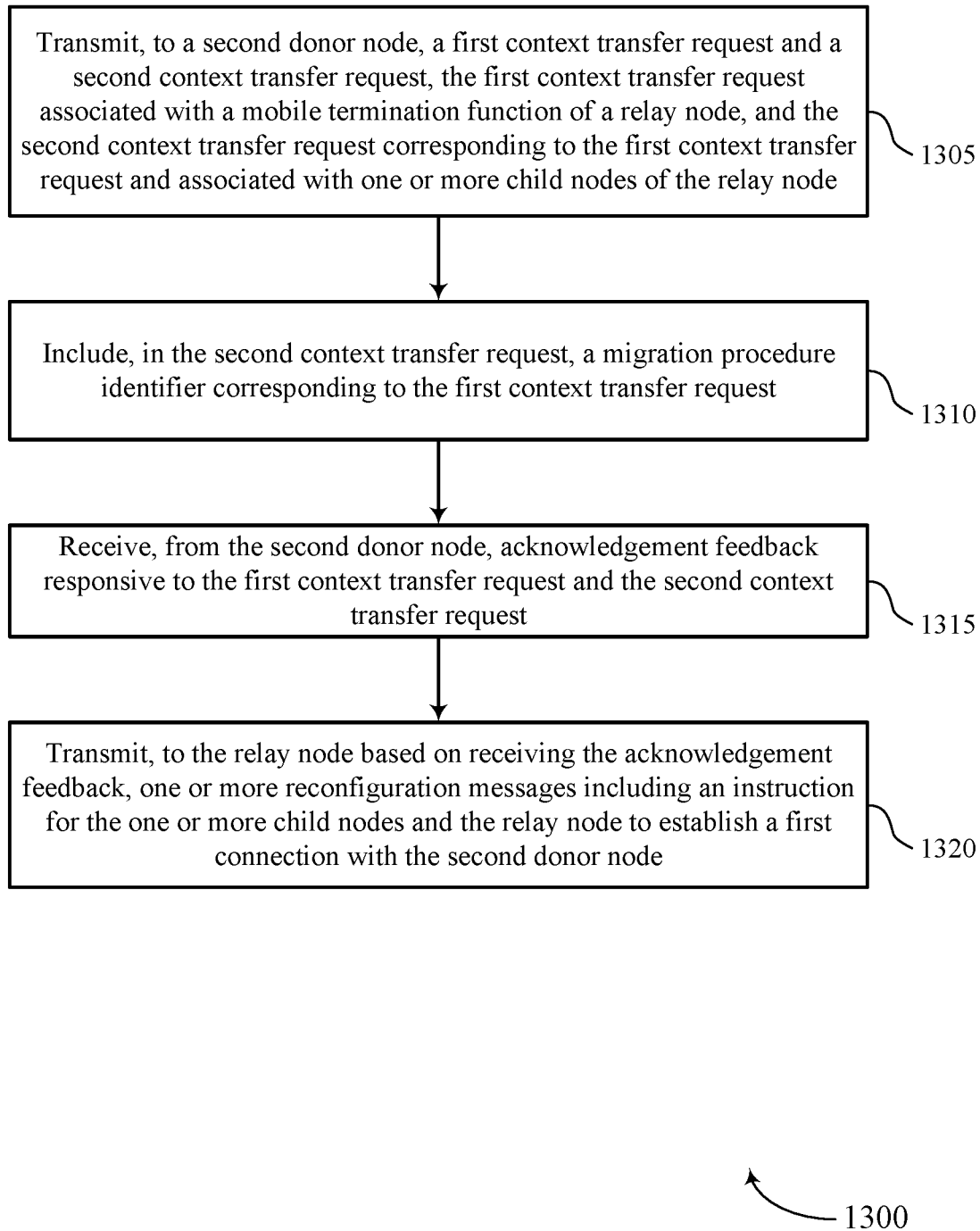

FIG. 13 shows a flowchart illustrating a method 1300 that supports enhanced context transfer of an IAB node in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a first donor node or a base station may execute a set of instructions to control the functional elements of the first donor node or the base station to perform the functions described herein. Additionally or alternatively, a first donor node or a base station may perform aspects of the functions described herein using special-purpose hardware.

At 1305, the first donor node may transmit, to a second donor node, a first context transfer request and a second context transfer request, the first context transfer request associated with an MT function of a relay node, and the second context transfer request corresponding to the first context transfer request and associated with one or more child nodes of the relay node. The operations of 1305 may be performed according to the methods described herein. In some examples, aspects of the operations of 1305 may be performed by a context transfer request manager as described with reference to FIGS. 8 through 11.

At 1310, the first donor node may include, in the second context transfer request, a migration procedure identifier corresponding to the first context transfer request. The operations of 1310 may be performed according to the methods described herein. In some examples, aspects of the operations of 1310 may be performed by a migration procedure identifier manager as described with reference to FIGS. 8 through 11.

At 1315, the first donor node may receive, from the second donor node, acknowledgement feedback responsive to the first context transfer request and the second context transfer request. The operations of 1315 may be performed according to the methods described herein. In some examples, aspects of the operations of 1315 may be performed by an acknowledgement feedback manager as described with reference to FIGS. 8 through 11.

At 1320, the first donor node may transmit, to the relay node based on receiving the acknowledgement feedback, one or more reconfiguration messages including an instruction for the one or more child nodes and the relay node to establish a first connection with the second donor node. The operations of 1320 may be performed according to the methods described herein. In some examples, aspects of the operations of 1320 may be performed by a reconfiguration message manager as described with reference to FIGS. 8 through 11.

Figure 14:
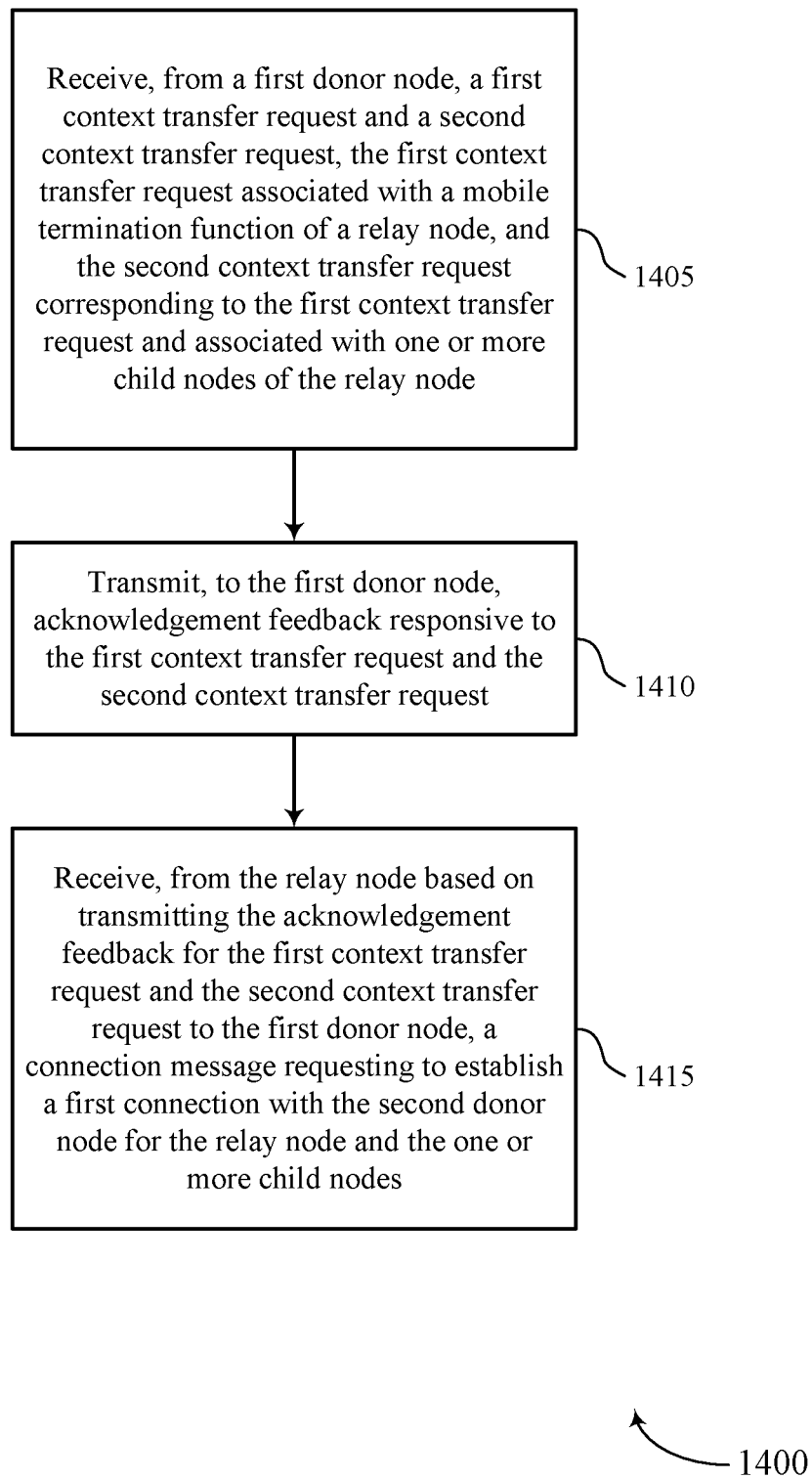

FIG. 14 shows a flowchart illustrating a method 1400 that supports enhanced context transfer of an IAB node in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a second donor node or a base station may execute a set of instructions to control the functional elements of the second donor node or the base station to perform the functions described herein. Additionally or alternatively, a second donor node or a base station may perform aspects of the functions described herein using special-purpose hardware.

At 1405, the second donor node may receive, from a first donor node, a first context transfer request and a second context transfer request, the first context transfer request associated with an MT function of a relay node, and the second context transfer request corresponding to the first context transfer request and associated with one or more child nodes of the relay node. The operations of 1405 may be performed according to the methods described herein. In some examples, aspects of the operations of 1405 may be performed by a context transfer request manager as described with reference to FIGS. 8 through 11.

At 1410, the second donor node may transmit, to the first donor node, acknowledgement feedback responsive to the first context transfer request and the second context transfer request. The operations of 1410 may be performed according to the methods described herein. In some examples, aspects of the operations of 1410 may be performed by an acknowledgement feedback manager as described with reference to FIGS. 8 through 11.

At 1415, the second donor node may receive, from the relay node based on transmitting the acknowledgement feedback for the first context transfer request and the second context transfer request to the first donor node, a connection message requesting to establish a first connection with the second donor node for the relay node and the one or more child nodes. The operations of 1415 may be performed according to the methods described herein. In some examples, aspects of the operations of 1415 may be performed by a connection message manager as described with reference to FIGS. 8 through 11.

Figure 15:
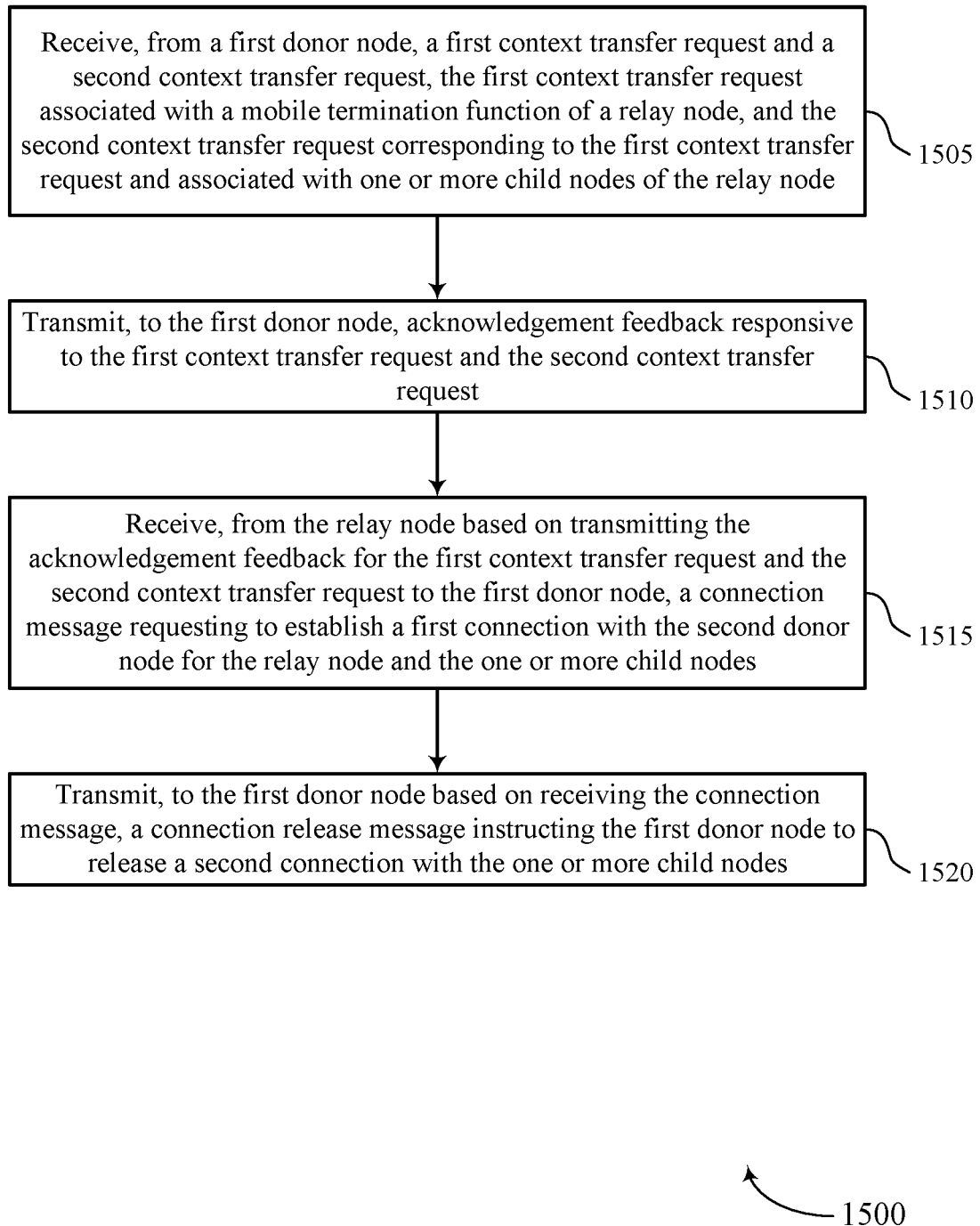

FIG. 15 shows a flowchart illustrating a method 1500 that supports enhanced context transfer of an IAB node in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a second donor node or a base station may execute a set of instructions to control the functional elements of the second donor node or the base station to perform the functions described herein. Additionally or alternatively, a second donor node or a base station may perform aspects of the functions described herein using special-purpose hardware.

At 1505, the second donor node may receive, from a first donor node, a first context transfer request and a second context transfer request, the first context transfer request associated with an MT function of a relay node, and the second context transfer request corresponding to the first context transfer request and associated with one or more child nodes of the relay node. The operations of 1505 may be performed according to the methods described herein. In some examples, aspects of the operations of 1505 may be performed by a context transfer request manager as described with reference to FIGS. 8 through 11.

At 1510, the second donor node may transmit, to the first donor node, acknowledgement feedback responsive to the first context transfer request and the second context transfer request. The operations of 1510 may be performed according to the methods described herein. In some examples, aspects of the operations of 1510 may be performed by an acknowledgement feedback manager as described with reference to FIGS. 8 through 11.

At 1515, the second donor node may receive, from the relay node based on transmitting the acknowledgement feedback for the first context transfer request and the second context transfer request to the first donor node, a connection message requesting to establish a first connection with the second donor node for the relay node and the one or more child nodes. The operations of 1515 may be performed according to the methods described herein. In some examples, aspects of the operations of 1515 may be performed by a connection message manager as described with reference to FIGS. 8 through 11.

At 1520, the second donor node may transmit, to the first donor node based on receiving the connection message, a connection release message instructing the first donor node to release a second connection with the one or more child nodes. The operations of 1520 may be performed according to the methods described herein. In some examples, aspects of the operations of 1520 may be performed by a connection release message manager as described with reference to FIGS. 8 through 11.

The following provides an overview of aspects of the present disclosure:

Aspect 1: A method for wireless communications at a first donor node, comprising: transmitting, to a second donor node, a first context transfer request and a second context transfer request, the first context transfer request associated with an MT function of a relay node, and the second context transfer request corresponding to the first context transfer request and associated with one or more child nodes of the relay node; receiving, from the second donor node, acknowledgement feedback responsive to the first context transfer request and the second context transfer request; and transmitting, to the relay node based at least in part on receiving the acknowledgement feedback, one or more reconfiguration messages comprising an instruction for the one or more child nodes and the relay node to establish a first connection with the second donor node.

Aspect 2: The method of aspect 1, wherein transmitting the first context transfer request and the second context transfer request comprises: transmitting a single message comprising the first context transfer request and the second context transfer request.

Aspect 3: The method of aspect 2, wherein the single message is a handover request message, a secondary node addition request message, a secondary node change required message, or a secondary node modification request message.

Aspect 4: The method of aspect 1, wherein transmitting the first context transfer request and the second context transfer request comprises: transmitting a first message comprising the first context transfer request; and transmitting a second message comprising the second context transfer request.

Aspect 5: The method of aspect 4, wherein the first message is a handover request message, a secondary node addition request message, or a secondary node modification request message; and the second message is a handover request message, a secondary node addition request message, a secondary node change required message, or a secondary node modification request message.

Aspect 6: The method of any of aspects 1 through 5, further comprising: including, in the second context transfer request, a migration procedure identifier corresponding to the first context transfer request, wherein receiving the acknowledgement feedback is based at least in part on the migration procedure identifier.

Aspect 7: The method of aspect 6, wherein the migration procedure identifier matches a second migration procedure identifier included in the first context transfer request, the second migration procedure identifier comprising a label associated with the first context transfer request, one or more device identifiers for the one or more child nodes, or a combination thereof.

Aspect 8: The method of any of aspects 6 through 7, wherein the migration procedure identifier comprises a device identifier for the relay node, the device identifier associated with base station interface communications between the first donor node and the second donor node.

Aspect 9: The method of any of aspects 6 through 8, wherein the migration procedure identifier comprises address information allocated to the relay node by the second donor node.

Aspect 10: The method of aspect 9, further comprising: receiving, from the second donor node or the relay node, an indication of the migration procedure identifier, wherein including the migration procedure identifier in the second context transfer request is based at least in part on receiving the indication of the migration procedure identifier.

Aspect 11: The method of aspect 10, further comprising: transmitting, to the second donor node or the relay node, a request for the indication of the migration procedure identifier, wherein receiving the indication of the migration procedure identifier from the second donor node or the relay node is based at least in part on transmitting the request for the indication of the migration procedure identifier.

Aspect 12: The method of any of aspects 1 through 11, further comprising: transmitting, to the second donor node, a third context transfer request corresponding to the second context transfer request, the third context transfer request associated with an MT function of one or more additional child nodes of the relay node, one or more additional child nodes associated with DU functions of the one or more child nodes, or a combination thereof.

Aspect 13: The method of aspect 12, wherein a single message comprises the first context transfer request, the second context transfer request, and the third context transfer request.

Aspect 14: The method of aspect 12, wherein a first message comprises the first context transfer request and the second context transfer request, and a second message comprises the third context transfer request.

Aspect 15: The method of aspect 12, wherein a first message comprises the first context transfer request, a second message comprises the second context transfer request, and a third message comprises the third context transfer request.

Aspect 16: The method of any of aspects 1 through 15, further comprising: including, in the first context transfer request, an indication of one or more context transfer requests to be transmitted.

Aspect 17: The method of aspect 16, wherein a first message comprises the first context transfer request, and the indication of the one or more context transfer requests to be transmitted comprises the second context transfer request in the first message.

Aspect 18: The method of aspect 16, wherein a first message comprises the first context transfer request, and the indication of the one or more context transfer requests to be transmitted comprises the second context transfer request in a second message.

Aspect 19: The method of any of aspects 1 through 18, further comprising: including, in a first message comprising the first context transfer request, an indication of a number of one or more subsequent context transfer requests corresponding to the first context transfer request, the one or more subsequent context transfer requests comprising the second context transfer request; and including, in a second message comprising the second context transfer request, an indication of a number of one or more previously transmitted context transfer requests corresponding to the second context transfer request.

Aspect 20: The method of any of aspects 1 through 18, further comprising: including, in the first context transfer request or the second context transfer request, an indication that no subsequent context transfer requests are pending.

Aspect 21: The method of any of aspects 1 through 20, further comprising: including, in the first context transfer request, a depth value indicating a number of hops in a chain of nodes that includes the relay node and the one or more child nodes.

Aspect 22: The method of any of aspects 1 through 21, further comprising: receiving, from the second donor node, an indication of a maximum number of corresponding context transfer requests that the second donor node is capable of processing in a single message; and configuring, based at least in part on receiving the indication of the maximum number, a single message comprising the first context transfer request and the second context transfer request, or a first message comprising the first context transfer request and a second message comprising the second context transfer request.

Aspect 23: The method of aspect 22, further comprising: transmitting, to the second donor node, a request for the maximum number, wherein receiving the indication of the maximum number is based at least in part on transmitting the request for the maximum number.

Aspect 24: The method of any of aspects 1 through 23, further comprising: receiving, from the second donor node responsive to transmitting a first message comprising the first context transfer request, a migration procedure identifier corresponding to the first context transfer request; and including the migration procedure identifier in a second message comprising the second context transfer request.

Aspect 25: The method of aspect 24, further comprising: including, in the first message, an indication that the first context transfer request is associated with the MT function of the relay node, wherein receiving the migration procedure identifier from the second donor node is based at least in part on the indication that the first context transfer request is associated with the MT function of the relay node.

Aspect 26: The method of any of aspects 24 through 25, further comprising: including, in the first context transfer request message, an indication of one or more context transfer requests to be transmitted, wherein receiving the migration procedure identifier from the second donor node is based at least in part on the indication of subsequent context transfer requests.

Aspect 27: The method of any of aspects 1 through 26, further comprising: including, in the second context transfer request, a cell identifier that is associated with the first donor node for a cell served by a DU function of the relay node, wherein receiving the acknowledgement feedback responsive to the first context transfer request and the second context transfer request is based at least in part on including the cell identifier for the cell served by the DU of the relay node.

Aspect 28: The method of any of aspects 1 through 27, further comprising: including, in the second context transfer request, a cell identifier associated with the second donor node for a cell that is not served by the second donor node, wherein receiving the acknowledgement feedback responsive to the first context transfer request and the second context transfer request is based at least in part on including the cell identifier for the cell that is not served by the second donor node.

Aspect 29: The method of aspect 28, further comprising: transmitting, to the second donor node, a request for a list of cell identifiers served by the second donor node; and receiving, from the second donor node, the list of cell identifiers served by the second donor node, wherein including the cell identifier associated with the second donor node for the cell that is not served by the second donor node is based at least in part on receiving the list of cell identifiers served by the second donor node.

Aspect 30: The method of any of aspects 1 through 29, wherein receiving the acknowledgement feedback responsive to the first context transfer request and the second context transfer request comprises: receiving an acknowledgement message comprising acknowledgement feedback for the first context transfer request and acknowledgement feedback for the second context transfer request.

Aspect 31: The method of aspect 30, wherein the acknowledgement message comprises one of a handover request acknowledgement message, a secondary node addition request acknowledgement message, a secondary node modification request acknowledgment message, or a secondary node change confirmation message.

Aspect 32: The method of any of aspects 1 through 29, wherein receiving the acknowledgement feedback responsive to the first context transfer request and the second context transfer request comprises: receiving a first acknowledgement message comprising acknowledgement feedback for the first context transfer request; and receiving a second acknowledgement message comprising acknowledgement feedback for the second context transfer request.

Aspect 33: The method of aspect 32, wherein the first acknowledgement message comprises one of a handover request acknowledgement message, a secondary node addition request acknowledgement message, a secondary node modification request acknowledgment message, or a secondary node change confirmation message, and the second acknowledgement message comprises one of a handover request acknowledgement message, a secondary node addition request acknowledgement message, a secondary node modification request acknowledgment message, or a secondary node change confirmation message.

Aspect 34: The method of any of aspects 1 through 33, further comprising: transmitting, to the second donor node, an indication of a maximum amount of acknowledgement feedback the first donor node is capable of processing in a single acknowledgement feedback message, wherein receiving the acknowledgement feedback responsive to the first context transfer request and the second context transfer request is based at least in part on transmitting the indication of the maximum amount of acknowledgement feedback.

Aspect 35: The method of aspect 34, further comprising: receiving, from the second donor node, a request for the maximum amount of acknowledgement feedback, wherein transmitting the indication of the maximum amount of acknowledgement feedback is based at least in part on receiving the request for the maximum amount of acknowledgement feedback.

Aspect 36: The method of any of aspects 1 through 35, wherein the one or more child nodes comprise UEs served by the relay node, one or more UEs served by descendant relay nodes of the relay node, MT functions of one or more additional relay nodes served by the relay node, MT functions of one or more descendant relay nodes of the relay node, or a combination thereof.

Aspect 37: The method of any of aspects 1 through 36, further comprising: transmitting, to the relay node based at least in part on receiving the acknowledgement feedback, one or more reconfiguration messages comprising an instruction for the one or more child nodes or the relay node or both to release one or more second connections with the first donor node, the relay node, or both.

Aspect 38: A method for wireless communication at a second donor node, comprising: receiving, from a first donor node, a first context transfer request and a second context transfer request, the first context transfer request associated with an MT function of a relay node, and the second context transfer request corresponding to the first context transfer request and associated with one or more child nodes of the relay node; transmitting, to the first donor node, acknowledgement feedback responsive to the first context transfer request and the second context transfer request; and receiving, from the relay node based at least in part on transmitting the acknowledgement feedback for the first context transfer request and the second context transfer request to the first donor node, a connection message requesting to establish a first connection with the second donor node for the relay node and the one or more child nodes.

Aspect 39: The method of aspect 38, wherein receiving the first context transfer request and the second context transfer request comprises: receiving a single message comprising the first context transfer request and the second context transfer request.

Aspect 40: The method of aspect 39, wherein the single message is a handover request message, a secondary node addition request message, a secondary node change required message, or a secondary node modification request message.

Aspect 41: The method of aspect 38, wherein receiving the first context transfer request and the second context transfer request comprises: receiving a first message comprising the first context transfer request; and receiving a second message comprising the second context transfer request.

Aspect 42: The method of aspect 41, wherein the first message is one of a handover request message, a secondary node addition request message, or a secondary node modification request message, and the second message is one of a handover request message, a secondary node addition request message, a secondary node change required message, or a secondary node modification request message.

Aspect 43: The method of any of aspects 38 through 42, further comprising: identifying, in the second context transfer request, a migration procedure identifier corresponding to the first context transfer request, wherein transmitting the acknowledgement feedback is based at least in part on identifying the migration procedure identifier.

Aspect 44: The method of aspect 43, wherein the migration procedure identifier matches a second migration procedure identifier included in the first context transfer request, the second migration procedure identifier comprising a label associated with the first context transfer request, one or more device identifiers for the one or more child nodes, or a combination thereof.

Aspect 45: The method of any of aspects 43 through 44, wherein the migration procedure identifier comprises a device identifier for the relay node, the device identifier associated with base station interface communications between the first donor node and the second donor node.

Aspect 46: The method of any of aspects 43 through 45, wherein the migration procedure identifier comprises address information allocated to the relay node by the second donor node.

Aspect 47: The method of aspect 46, further comprising: transmitting, to the first donor node, an indication of the migration procedure identifier, wherein identifying the migration procedure identifier in the second context transfer request is based at least in part on transmitting the indication of the migration procedure identifier to the first donor node.

Aspect 48: The method of aspect 47, further comprising: receiving, from the first donor node, a request for the indication of the migration procedure identifier, wherein transmitting the indication of the migration procedure identifier is based at least in part on receiving the request for the indication of the migration procedure identifier.

Aspect 49: The method of any of aspects 38 through 48, further comprising: receiving, from the first donor node, a third context transfer request corresponding to the second context transfer request, the third context transfer request associated with an MT function of one or more additional child nodes of the relay node, one or more additional child nodes associated with DU functions of the one or more child nodes, or a combination thereof.

Aspect 50: The method of aspect 49, wherein a first message comprises the first context transfer request, the second context transfer request, and the third context transfer request.

Aspect 51: The method of aspect 49, wherein a first message comprises the first context transfer request and the second context transfer request, and a second message comprises the third context transfer request.

Aspect 52: The method of aspect 49, wherein a first message comprises the first context transfer request, a second message comprises the second context transfer request, and a third message comprises the third context transfer request.

Aspect 53: The method of any of aspects 38 through 52, further comprising: identifying, in the first context transfer request, an indication of one or more context transfer requests to be transmitted.

Aspect 54: The method of aspect 53, wherein a first message comprises the first context transfer request, and the indication of the one or more context transfer requests to be transmitted comprises the second context transfer request in the first message.

Aspect 55: The method of aspect 54, wherein a number of the one or more additional context transfer requests located in the first transfer request message exceeds a processing capability per received message for the second donor node.

Aspect 56: The method of any of aspects 38 through 55, further comprising: identifying, in a first message comprising the first context transfer request, an indication of a number of one or more subsequent context transfer requests to be transmitted corresponding to the first context transfer request, the one or more subsequent context transfer requests comprising the second context transfer request; and identifying, in a second message comprising the second context transfer request, an indication of a number of one or more previously transmitted context transfer requests corresponding to the second context transfer request.

Aspect 57: The method of any of aspects 38 through 55, further comprising: identifying, in first context transfer request or the second context transfer request, an indication that no subsequent context transfer requests are pending.

Aspect 58: The method of any of aspects 38 through 57, further comprising: identifying, in the first context transfer request, a depth value indicating a number of hops in a chain of nodes that includes the relay node and the one or more child nodes.

Aspect 59: The method of any of aspects 38 through 58, further comprising: transmitting, to the first donor node, an indication of a maximum number of corresponding context transfer requests that the second donor node is capable of processing in a single message, wherein receiving the first context transfer request and the second context transfer request is based at least in part on transmitting the indication of the maximum number.

Aspect 60: The method of aspect 59, further comprising: receiving, from the first donor node, a request for the maximum number, wherein transmitting the indication of the maximum number is based at least in part on receiving the request for the maximum number.

Aspect 61: The method of any of aspects 38 through 60, further comprising: transmitting, to the first donor node responsive to receiving a first message comprising the first context transfer request, a migration procedure identifier corresponding to the first context transfer request; and identifying the migration procedure identifier in a second message comprising the second context transfer request.

Aspect 62: The method of aspect 61, further comprising: identifying, in the first message, an indication that the first context transfer request is associated with the MT function of the relay node, wherein transmitting the migration procedure identifier to the first donor node is based at least in part on the indication that the first context transfer request is associated with the MT function of the relay node.

Aspect 63: The method of any of aspects 61 through 62, further comprising: identifying, in the first message, an indication of one or more context transfer requests to be transmitted, wherein transmitting the migration procedure identifier from the second donor node is based at least in part on the indication of the one or more context transfer requests to be transmitted.

Aspect 64: The method of any of aspects 38 through 63, further comprising: identifying, in the second context transfer request, a cell identifier that is associated with the first donor node for a cell served by a DU of the relay node; and determining, based at least in part on the cell identifier, that the second context transfer request corresponds to the first context transfer request, wherein transmitting the acknowledgement feedback responsive to the first context transfer request and the second context transfer request is based at least in part on determining that the second context transfer request corresponds to the first context transfer request.

Aspect 65: The method of any of aspects 38 through 64, further comprising: identifying, in the second context transfer request, a cell identifier associated with the second donor node for a cell that is not served by the second donor node; and determining, based at least in part on the cell identifier that is not served by the second donor node, that the second context transfer request corresponds to the first context transfer request, wherein transmitting the acknowledgement feedback responsive to the first context transfer request and the second context transfer request is based at least in part on determining that the second context transfer request corresponds to the first context transfer request.

Aspect 66: The method of aspect 65, further comprising: receiving, from the first donor node, a request for a list of cell identifiers served by the second donor node; and transmitting, to the first donor node, the list of cell identifiers served by the second donor node, wherein identifying the cell identifier associated with the second donor node for the cell that is not served by the second donor node is based at least in part on the list of cell identifiers served by the second donor node.

Aspect 67: The method of any of aspects 38 through 66, wherein transmitting the acknowledgement feedback responsive to the first context transfer request and the second context transfer request comprises: transmitting an acknowledgement message comprising acknowledgement feedback for the first context transfer request and acknowledgement feedback for the second context transfer request.

Aspect 68: The method of aspect 67, wherein the acknowledgement message comprises one of a handover request acknowledgement message, a secondary node addition request acknowledgement message, a secondary node modification request acknowledgment message, or a secondary node change confirmation message.

Aspect 69: The method of any of aspects 38 through 66, wherein transmitting the acknowledgement feedback responsive to the first context transfer request and the second context transfer request comprises: transmitting a first acknowledgement message comprising acknowledgement feedback for the first context transfer request; and transmitting a second acknowledgement message comprising acknowledgement feedback for the second context transfer request.

Aspect 70: The method of aspect 69, wherein the first acknowledgement message comprises one of a handover request acknowledgement message, a secondary node addition request acknowledgement message, a secondary node modification request acknowledgment message, or a secondary node change confirmation message, and the second acknowledgement message comprises one of a handover request acknowledgement message, a secondary node addition request acknowledgement message, a secondary node modification request acknowledgment message, or a secondary node change confirmation message.

Aspect 71: The method of any of aspects 38 through 70, further comprising: receiving, from the first donor node, an indication of a maximum amount of acknowledgement feedback the first donor node is capable of processing in a single acknowledgement feedback message, wherein transmitting the acknowledgement feedback responsive to the first context transfer request and the second context transfer request is based at least in part on receiving the indication of the maximum amount of acknowledgement feedback.

Aspect 72: The method of aspect 71, further comprising: transmitting, to the first donor node, a request for the maximum amount of acknowledgement feedback, wherein receiving the indication of the maximum amount of acknowledgement feedback is based at least in part on transmitting the request for the maximum amount of acknowledgement feedback.

Aspect 73: The method of any of aspects 38 through 72, wherein the one or more child nodes comprise UEs served by the relay node, one or more UEs served by descendant relay nodes of the relay node, MT functions of one or more additional relay nodes served by the relay node, MT functions of one or more descendant relay nodes of the relay node, or a combination thereof.

Aspect 74: An apparatus for wireless communications at a first donor node, comprising a processor; memory coupled with the processor; and instructions stored in the memory and executable by the processor to cause the apparatus to perform a method of any of aspects 1 through 37.

Aspect 75: An apparatus for wireless communications at a first donor node, comprising at least one means for performing a method of any of aspects 1 through 37.

Aspect 76: A non-transitory computer-readable medium storing code for wireless communications at a first donor node, the code comprising instructions executable by a processor to perform a method of any of aspects 1 through 37.

Aspect 77: An apparatus for wireless communication at a second donor node, comprising a processor; memory coupled with the processor; and instructions stored in the memory and executable by the processor to cause the apparatus to perform a method of any of aspects 38 through 73.

Aspect 78: An apparatus for wireless communication at a second donor node, comprising at least one means for performing a method of any of aspects 38 through 73.

Aspect 79: A non-transitory computer-readable medium storing code for wireless communication at a second donor node, the code comprising instructions executable by a processor to perform a method of any of aspects 38 through 73.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first donor node, comprising:
   transmitting, to a second donor node, a first context transfer request and a second context transfer request, wherein the first context transfer request is for a mobile termination function of a relay node and the second context transfer request is for one or more child nodes served by a distributed unit function of the relay node, wherein the second context transfer request includes a migration procedure identifier corresponding to the first context transfer request, and wherein the migration procedure identifier indicates that the second context transfer request is for the one or more child nodes served by the distributed unit function of the relay node;
   receiving, from the second donor node, acknowledgement feedback responsive to the first context transfer request and the second context transfer request based at least in part on the migration procedure identifier included in the second context transfer request; and
   transmitting, to the relay node based at least in part on receiving the acknowledgement feedback, one or more reconfiguration messages comprising an instruction for the one or more child nodes and the relay node to establish a first connection with the second donor node.

2. The method of claim 1, wherein transmitting the first context transfer request and the second context transfer request comprises:
   transmitting a single message comprising the first context transfer request and the second context transfer request.

3. The method of claim 1, wherein transmitting the first context transfer request and the second context transfer request comprises:
   transmitting a first message comprising the first context transfer request; and
   transmitting a second message comprising the second context transfer request.

4. The method of claim 1, further comprising:
   transmitting, to the second donor node, a third context transfer request corresponding to the second context transfer request, the third context transfer request associated with a mobile termination function of one or more additional child nodes of the relay node, one or more additional child nodes associated with distributed unit functions of the one or more child nodes, or a combination thereof.

5. The method of claim 1, further comprising:
   including, in the first context transfer request, an indication of one or more context transfer requests to be transmitted.

6. The method of claim 1, further comprising:
   including, in a first message comprising the first context transfer request, an indication of a number of one or more subsequent context transfer requests corresponding to the first context transfer request, the one or more subsequent context transfer requests comprising the second context transfer request.

7. The method of claim 1, further comprising:
   including, in the first context transfer request, a depth value indicating a number of hops in a chain of nodes that includes the relay node and the one or more child nodes.

8. The method of claim 1, further comprising:
   receiving, from the second donor node, an indication of a maximum number of corresponding context transfer requests that the second donor node is capable of processing in a single message; and
   configuring, based at least in part on receiving the indication of the maximum number, a single message comprising the first context transfer request and the second context transfer request, or a first message comprising the first context transfer request and a second message comprising the second context transfer request.

9. The method of claim 1, further comprising:
   receiving, from the second donor node responsive to transmitting a first message comprising the first context transfer request, the migration procedure identifier corresponding to the first context transfer request; and
   including the migration procedure identifier in a second message comprising the second context transfer request.

10. The method of claim 1, further comprising:
including, in the second context transfer request, a cell identifier that is associated with the first donor node for a cell served by the distributed unit function of the relay node, wherein receiving the acknowledgement feedback responsive to the first context transfer request and the second context transfer request is based at least in part on including the cell identifier for the cell served by the distributed unit function of the relay node.

11. The method of claim 1, further comprising:
including, in the second context transfer request, a cell identifier associated with the second donor node for a cell that is not served by the second donor node, wherein receiving the acknowledgement feedback responsive to the first context transfer request and the second context transfer request is based at least in part on including the cell identifier for the cell that is not served by the second donor node.

12. The method of claim 1, wherein receiving the acknowledgement feedback responsive to the first context transfer request and the second context transfer request comprises:
receiving an acknowledgement message comprising acknowledgement feedback for the first context transfer request and acknowledgement feedback for the second context transfer request.

13. The method of claim 1, wherein receiving the acknowledgement feedback responsive to the first context transfer request and the second context transfer request comprises:
receiving a first acknowledgement message comprising acknowledgement feedback for the first context transfer request; and
receiving a second acknowledgement message comprising acknowledgement feedback for the second context transfer request.

14. A method for wireless communication at a second donor node, comprising:
receiving, from a first donor node, a first context transfer request and a second context transfer request, wherein the first context transfer request is for a mobile termination function of a relay node and the second context transfer request is for one or more child nodes served by a distributed unit function of the relay node, wherein the second context transfer request includes a migration procedure identifier corresponding to the first context transfer request, and wherein the migration procedure identifier indicates that the second context transfer request is for the one or more child nodes served by the distributed unit function of the relay node;
transmitting, to the first donor node, acknowledgement feedback responsive to the first context transfer request and the second context transfer request based at least in part on the migration procedure identifier included in the second context transfer request; and
receiving, from the relay node based at least in part on transmitting the acknowledgement feedback responsive to the first context transfer request and the second context transfer request to the first donor node, a connection message requesting to establish a first connection with the second donor node for the relay node and the one or more child nodes.

15. The method of claim 14, wherein receiving the first context transfer request and the second context transfer request comprises:
receiving a single message comprising the first context transfer request and the second context transfer request.

16. The method of claim 14, wherein receiving the first context transfer request and the second context transfer request comprises:
receiving a first message comprising the first context transfer request; and
receiving a second message comprising the second context transfer request.

17. The method of claim 14, further comprising:
receiving, from the first donor node, a third context transfer request corresponding to the second context transfer request, the third context transfer request associated with a mobile termination function of one or more additional child nodes of the relay node, one or more additional child nodes associated with distributed unit functions of the one or more child nodes, or a combination thereof.

18. The method of claim 14, further comprising:
identifying, in the first context transfer request, an indication of one or more context transfer requests to be transmitted.

19. The method of claim 14, further comprising:
identifying, in a first message comprising the first context transfer request, an indication of a number of one or more subsequent context transfer requests to be transmitted corresponding to the first context transfer request, the one or more subsequent context transfer requests comprising the second context transfer request.

20. The method of claim 14, further comprising:
identifying, in the first context transfer request, a depth value indicating a number of hops in a chain of nodes that includes the relay node and the one or more child nodes.

21. The method of claim 14, further comprising:
transmitting, to the first donor node, an indication of a maximum number of corresponding context transfer requests that the second donor node is capable of processing in a single message, wherein receiving the first context transfer request and the second context transfer request is based at least in part on transmitting the indication of the maximum number.

22. The method of claim 14, further comprising:
transmitting, to the first donor node responsive to receiving a first message comprising the first context transfer request, the migration procedure identifier corresponding to the first context transfer request; and
identifying the migration procedure identifier in a second message comprising the second context transfer request.

23. The method of claim 14, further comprising:
identifying, in the second context transfer request, a cell identifier that is associated with the first donor node for a cell served by the distributed unit of the relay node; and
determining, based at least in part on the cell identifier, that the second context transfer request corresponds to the first context transfer request, wherein transmitting the acknowledgement feedback responsive to the first context transfer request and the second context transfer request is based at least in part on determining that the second context transfer request corresponds to the first context transfer request.

24. The method of claim 14, further comprising:
identifying, in the second context transfer request, a cell identifier associated with the second donor node for a cell that is not served by the second donor node; and determining, based at least in part on the cell identifier that is not served by the second donor node, that the second context transfer request corresponds to the first context transfer request, wherein transmitting the acknowledgement feedback responsive to the first context transfer request and the second context transfer request is based at least in part on determining that the second context transfer request corresponds to the first context transfer request.

25. The method of claim 14, wherein transmitting the acknowledgement feedback responsive to the first context transfer request and the second context transfer request comprises:
   transmitting an acknowledgement message comprising acknowledgement feedback for the first context transfer request and acknowledgement feedback for the second context transfer request.

26. The method of claim 14, wherein transmitting the acknowledgement feedback responsive to the first context transfer request and the second context transfer request comprises:
   transmitting a first acknowledgement message comprising acknowledgement feedback for the first context transfer request; and
   transmitting a second acknowledgement message comprising acknowledgement feedback for the second context transfer request.

27. An apparatus for wireless communications at a first donor node, comprising:
   a processor,
   memory coupled with the processor; and
   instructions stored in the memory and executable by the processor to cause the apparatus to:
      transmit, to a second donor node, a first context transfer request and a second context transfer request, wherein the first context transfer request is for a mobile termination function of a relay node and wherein the second context transfer request is for one or more child nodes served by a distributed unit function of the relay node, wherein the second context transfer request includes a migration procedure identifier corresponding to the first context transfer request, and wherein the migration procedure identifier indicates that the second context transfer request is for the one or more child nodes served by the distributed unit function of the relay node;
      receive, from the second donor node, acknowledgement feedback responsive to the first context transfer request and the second context transfer request based at least in part on the migration procedure identifier included in the second context transfer request; and
      transmit, to the relay node based at least in part on receiving the acknowledgement feedback, one or more reconfiguration messages comprising an instruction for the one or more child nodes and the relay node to establish a first connection with the second donor node.

28. An apparatus for wireless communication at a second donor node, comprising:
   a processor,
   memory coupled with the processor; and
   instructions stored in the memory and executable by the processor to cause the apparatus to:
      receive, from a first donor node, a first context transfer request and a second context transfer request, wherein the first context transfer request is for a mobile termination function of a relay node and the second context transfer request is for one or more child nodes served by a distributed unit function of the relay node, wherein the second context transfer request includes a migration procedure identifier corresponding to the first context transfer request, and wherein the migration procedure identifier indicates that the second context transfer request is for the one or more child nodes served by the distributed unit function of the relay node;
      transmit, to the first donor node, acknowledgement feedback responsive to the first context transfer request and the second context transfer request based at least in part on the migration procedure identifier included in the second context transfer request; and
      receive, from the relay node based at least in part on transmitting the acknowledgement feedback responsive to the first context transfer request and the second context transfer request to the first donor node, a connection message requesting to establish a first connection with the second donor node for the relay node and the one or more child nodes.

* * * * *